United States Patent
Yao et al.

(10) Patent No.: US 11,749,010 B2
(45) Date of Patent: Sep. 5, 2023

(54) FINGERPRINT RECOGNITION MODULE, DISPLAY PANEL AND DRIVING METHOD, AND DISPLAY DEVICE

(71) Applicant: Xiamen Tianma Micro-Electronics Co., Ltd., Xiamen (CN)

(72) Inventors: Qijun Yao, Shanghai (CN); Bo Zhang, Shanghai (CN); Feng Lu, Shanghai (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 196 days.

(21) Appl. No.: 17/242,928

(22) Filed: Apr. 28, 2021

(65) Prior Publication Data

US 2022/0230009 A1 Jul. 21, 2022

(30) Foreign Application Priority Data

Jan. 21, 2021 (CN) .......................... 202110079487.7

(51) Int. Cl.
*G06V 40/13* (2022.01)
*B06B 1/02* (2006.01)
(Continued)

(52) U.S. Cl.
CPC ........ *G06V 40/1306* (2022.01); *B06B 1/0207* (2013.01); *B06B 1/0696* (2013.01);
(Continued)

(58) Field of Classification Search
CPC ............... G06F 3/0412; G06F 3/04164; G06F 3/04184; G06F 3/043–0436; G06F 21/32;
(Continued)

(56) References Cited

U.S. PATENT DOCUMENTS

| 9,613,246 B1 * | 4/2017 | Gozzini | H01L 41/25 |
| 2004/0054287 A1 * | 3/2004 | Stephens | G01N 29/2468 |
| | | | 600/459 |

(Continued)

FOREIGN PATENT DOCUMENTS

| CN | 109407818 A | 3/2019 | |
| CN | 109829419 A | 5/2019 | |
| KR | 10-2019-0179953 | * 12/2019 | H01L 27/12 |

*Primary Examiner* — Roberto W Flores
*Assistant Examiner* — Aaron Midkiff
(74) *Attorney, Agent, or Firm* — ANOVA LAW GROUP PLLC

(57) ABSTRACT

A fingerprint recognition module, a display panel and driving method, and a display device are provided. The fingerprint recognition module includes a first electrode layer including a plurality of first electrodes, and a piezoelectric layer disposed on a side of the first electrode layer. The fingerprint recognition module also includes a second electrode layer disposed on a side of the piezoelectric layer facing away from the first electrode layer. The second electrode layer includes a plurality of second electrodes that are arranged along a first direction, and one second electrode overlaps at least two first electrodes. Moreover, the fingerprint recognition module includes a flexible circuit board bonded and connected to the plurality of second electrodes. In a plane parallel to the first electrode layer, the plurality of second electrodes and the flexible circuit board are arranged along a second direction, and the first direction intersects the second direction.

18 Claims, 11 Drawing Sheets

(51) Int. Cl.
*B06B 1/06* (2006.01)
*G06F 3/043* (2006.01)

(52) U.S. Cl.
CPC .......... *G06F 3/043* (2013.01); *B06B 2201/56* (2013.01); *B06B 2201/70* (2013.01)

(58) Field of Classification Search
CPC . G06F 3/044–0448; G06F 1/325–3259; G06F 3/04106; G06F 2203/04106; G06F 3/0433; G06F 3/0436; G06F 3/0445; G06F 2203/04103; B06B 1/00–20; B06B 2201/00–77; B06B 1/0207; B06B 1/0696; B06B 2201/56; B06B 1/0688–0696; B06B 2201/55–56; B06B 2201/70; B06B 2201/50–58; B06B 1/06–0696; G06V 40/1603; G06V 40/12–1306; G06V 40/10–197; G06V 10/147; G06V 40/1306; G06V 40/1365; G09G 2300/0421; G09G 2300/0426; G09G 3/3655; H10N 30/05; H10N 30/302; H10N 30/50; H10N 30/802; H10N 30/87
See application file for complete search history.

(56) References Cited

U.S. PATENT DOCUMENTS

| | | | |
|---|---|---|---|
| 2014/0354823 A1* | 12/2014 | Kitchens | G06F 3/041661 348/163 |
| 2021/0019018 A1* | 1/2021 | Guo | G06V 40/1306 |
| 2021/0200366 A1* | 7/2021 | Bok | H04R 7/04 |

* cited by examiner

FINGERPRINT RECOGNITION MODULE, DISPLAY PANEL AND DRIVING METHOD, AND DISPLAY DEVICE

CROSS-REFERENCE TO RELATED APPLICATION

This application claims the priority of Chinese patent application No. 202110079487.7, filed on Jan. 21, 2021, the entirety of which is incorporated herein by reference.

FIELD

The present disclosure generally relates to the field of display technology and, more particularly, relates to a fingerprint recognition module, a display panel and driving method, and a display device.

BACKGROUND

With the development of technology, a variety of display devices with fingerprint recognition function have appeared on the market, such as a mobile phone, a tablet computer, and a smart wearable device. Because fingerprints are inherent and unique to individuals, the use of fingerprint recognition function is capable of improving the safety factor of the display device. Before operating the display device with a fingerprint recognition function, authorization verification may be performed by touching the display device with a finger, which simplifies the authorization verification process. Fingerprint recognition technology may often be divided into optical fingerprint recognition technology, silicon-chip fingerprint recognition technology, and ultrasonic fingerprint recognition technology.

Currently, ultrasonic fingerprint recognition technology is a popular research direction for major manufacturers. In ultrasonic under-screen fingerprint recognition technology, a high-voltage is often used to drive a piezoelectric film layer to form ultrasonic waves. To obtain sufficient fingerprint signals, strong ultrasonic waves are needed, and the driving voltage often reaches approximately 100 V. However, a large-area ultrasonic fingerprint recognition unit in the display screen easily causes a large capacitance in the entire driving loop and a substantially high power loss during the driving process. For example, for an ultrasonic fingerprint recognition unit with an area of approximately 1 $cm^2$, the parasitic capacitance may reach 1 nF, and the peak current can reach 6 A driven by a peak voltage of 100 V with 10 MHz frequency. For a driving loop resistance of 1 ohm, the power can reach as high as 18 W.

Therefore, how to provide a fingerprint recognition module, a display panel and driving method, and a display device that is capable of reducing power consumption, achieving ultrasonic fingerprint recognition, and improving recognition performance is an urgent problem that needs to be solved.

SUMMARY

One aspect of the present disclosure provides a fingerprint recognition module. The fingerprint recognition module includes a first electrode layer including a plurality of first electrodes that are arranged in an array, and a piezoelectric layer disposed on a side of the first electrode layer. The fingerprint recognition module also includes a second electrode layer disposed on a side of the piezoelectric layer facing away from the first electrode layer. The second electrode layer includes a plurality of second electrodes that are arranged along a first direction, and one second electrode of the plurality of second electrodes overlaps at least two first electrodes of the plurality of first electrodes. Moreover, the fingerprint recognition module includes a flexible circuit board bonded and connected to the plurality of second electrodes. In a plane parallel to the first electrode layer, the plurality of second electrodes and the flexible circuit board are arranged along a second direction, and the first direction intersects the second direction.

Another aspect of the present disclosure provides a display panel. The display panel includes a fingerprint recognition module. The fingerprint recognition module includes a first electrode layer including a plurality of first electrodes that are arranged in an array, and a piezoelectric layer disposed on a side of the first electrode layer. The fingerprint recognition module also includes a second electrode layer disposed on a side of the piezoelectric layer facing away from the first electrode layer. The second electrode layer includes a plurality of second electrodes that are arranged along a first direction, and one second electrode of the plurality of second electrodes overlaps at least two first electrodes of the plurality of first electrodes. Moreover, the fingerprint recognition module includes a flexible circuit board bonded and connected to the plurality of second electrodes. In a plane parallel to the first electrode layer, the plurality of second electrodes and the flexible circuit board are arranged along a second direction, and the first direction intersects the second direction.

Another aspect of the present disclosure provides a driving method of a display panel. The driving method is configured to drive the display panel to perform a touch detection and a fingerprint recognition. The driving method includes providing the display panel. The display panel includes a fingerprint recognition module and a touch-control layer. The fingerprint recognition module includes a first electrode layer including a plurality of first electrodes, a piezoelectric layer disposed on a side of the first electrode layer, and a second electrode layer disposed on a side of the piezoelectric layer facing away from the first electrode layer. The second electrode layer includes a plurality of second electrodes. The fingerprint recognition module also includes a flexible circuit board bonded and connected to the plurality of second electrodes, and a driving circuit layer electrically connected to the first electrode layer. The driving circuit layer includes a plurality of driving circuits, a common signal line, a scanning line, a detection signal line, a power signal line, and a sampling signal line, and a driving circuit of the plurality of driving circuits includes a first transistor, a second transistor, a third transistor, and a storage capacitor. The driving method also includes determining a touch position of a finger through the touch-control layer, for the touch detection; and determining a second electrode of the plurality of second electrodes corresponding to the touch position of the finger. Moreover, the driving method includes providing an excitation signal only to the second electrode corresponding to the touch position of the finger. A corresponding first electrode of the plurality of first electrodes is connected to a common potential, and the piezoelectric layer between the second electrode and the first electrode corresponding to the touch position of the finger generates ultrasonic waves. Further, the driving method includes performing, by the driving circuit corresponding to the second electrode corresponding to the touch position of the finger, ultrasonic fingerprint recognition, for the fingerprint recognition.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

The terms used in the disclosed embodiments of the present disclosure are merely for the purpose of describing specific embodiments and are not intended to limit the present disclosure. Similar reference numbers and letters represent similar terms in the following Figures, such that once an item is defined in one Figure, it does not need to be further discussed in subsequent Figures.

Figure 1:
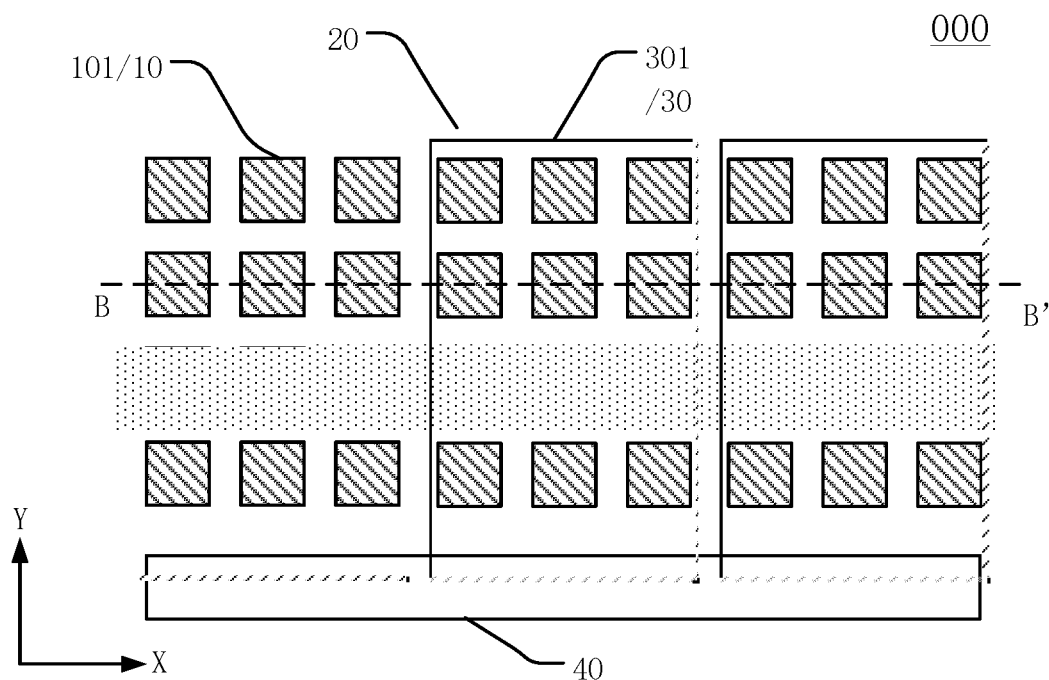
FIG. 1 illustrates a schematic top-view of an exemplary fingerprint recognition module consistent with disclosed embodiments of the present disclosure.
Figure 2:
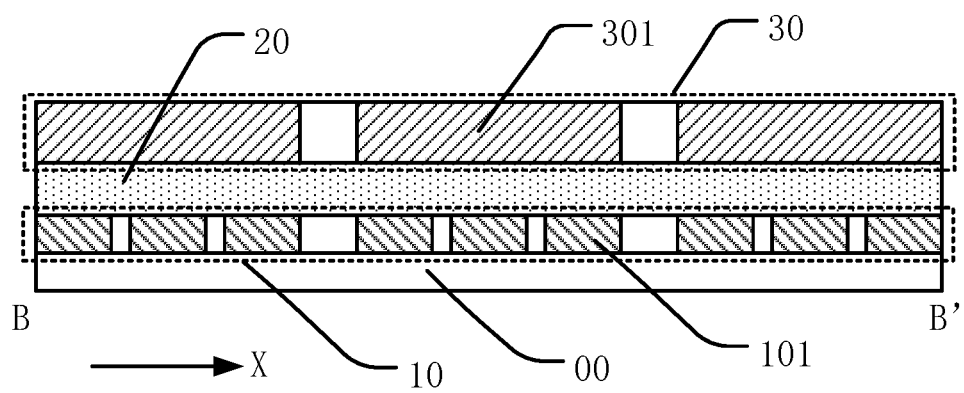
FIG. 2 illustrates a schematic B-B' sectional view of an exemplary fingerprint recognition module in FIG. 1 consistent with disclosed embodiments of the present disclosure.

The present disclosure provides a fingerprint recognition module. FIG. 1 illustrates a schematic top-view of a fingerprint recognition module consistent with disclosed embodiments of the present disclosure; and FIG. 2 illustrates a schematic B-B' sectional view of the fingerprint recognition module in FIG. 1. Referring to FIG. 1 and FIG. 2, the fingerprint recognition module 000 may include a first electrode layer 10 including a plurality of first electrodes 101 that are arranged in an array, a piezoelectric layer 20 disposed on a side of the first electrode layer 10, and a second electrode layer 30 disposed on a side of the piezoelectric layer 20 facing away from the first electrode layer 10. For illustrative purposes, to clearly illustrate the positional relationship between the first electrode layer and the second electrode layer, FIG. 1 illustrates a transparency filling. The second electrode layer 30 may include a plurality of second electrodes 301 that are arranged along a first direction X. Optionally, adjacent second electrodes 301 may be insulated from each other. One second electrode 301 may overlap at least two first electrodes 101.

In addition, the fingerprint recognition module may also include a flexible circuit board 40 (not filled in FIG. 1) bonded and connected to the second electrodes 301. In a plane parallel to the first electrode layer 10, the second electrode 301 and the flexible circuit board 40 may be arranged along a second direction Y. The first direction X may intersect the second direction Y. Optionally, in the plane parallel to the first electrode layer 10, the first direction X may be perpendicular to the second direction Y. Optionally, referring to FIG. 2, the structure of the fingerprint recognition module 000 may be formed over a substrate 00, and the substrate 00 may be configured to carry the above-mentioned film structures of the fingerprint recognition module 000.

Specifically, the fingerprint recognition module 000 in the present disclosure may be a fingerprint recognition module using ultrasonic technology. The fingerprint recognition module 000 may mainly include three stacked structures of the first electrode layer 10, the piezoelectric layer 20, and the second electrode layer 30. The first electrode layer 10 may include the plurality of first electrodes 101, and the plurality of first electrodes 101 may be arranged in an array. Optionally, adjacent first electrodes 101 may be insulated from each other. The second electrode layer 30 disposed on the side of the piezoelectric layer 20 facing away from the first electrode layer 10 may include the plurality of second electrodes 301 that are insulated from each other, and the plurality of second electrodes 301 may be arranged along the first direction X. One second electrode 301 may overlap at least two first electrodes 101. Optionally, the piezoelectric layer 20 may be laid on a surface of the first electrode layer 10 as an entity. The second electrode 301 may be used as a driving electrode (a transmitting terminal), and the first electrode 101 may be used as a receiving electrode (a receiving terminal).

When the fingerprint recognition module 000 performs fingerprint recognition, the flexible circuit board 40 may provide an alternating current signal to the second electrode 301. The driving voltage applied between the first electrode 101 and the second electrode 301 may change constantly, and, thus, the piezoelectric layer 20 may vibrate to generate ultrasonic waves. When performing a touch recognition on a touch-control subject such as a finger, because the fingerprint includes valleys and ridges, vibration intensities of ultrasonic waves reflected by the fingerprint back to the piezoelectric layer 20 may be different, and the electrical signals generated by the ultrasonic waves reflected by valleys and ridges of the fingerprint back to the piezoelectric layer 20 may change differently. According to the voltage signals that change differently, the positions of the valleys and the ridges of the fingerprint may be determined, the determination result may be fed back to the first electrode 101, and may be ultimately read and be converted to a fingerprint image by the flexible circuit board 40, to achieve the fingerprint recognition.

In the fingerprint recognition module 000, the second electrode layer 30 may include a plurality of second electrodes 301 that are insulated from each other. For illustrative purposes, FIG. 1 illustrates that the second electrode layer may include three second electrodes as an example. The flexible circuit board 40 that provides the driving voltage signal for the fingerprint recognition module 000 and reads the fingerprint detection signal may be directly bonded and connected to the second electrodes 301. In other words, referring to FIG. 1 and FIG. 2, the second electrodes 301 may be extended to a region where the flexible circuit board 40 is located and may partially overlap the flexible circuit board 40, thereby achieving the direct binding connection between the flexible circuit board 40 and the second electrodes 301.

In the prior art, the second electrode 301 is often connected to the flexible circuit board 40 through a thin lead to achieve the transmission of an electrical signal. A width of the lead used as a wiring is significantly different from a width of the second electrode 301 used as a driving electrode, and the width of the general lead is much smaller and is a few hundredths or even a few thousandths of the width of the second electrode 301. According to the calculation formula of resistance: $R=\rho L/S$, where R is resistance, $\rho$ is resistivity, L is a length of a resistor, and S is a cross-sectional area of the resistor, the size of the line width may affect the size of the cross-sectional area of the resistor, thereby affecting the resistance value of the resistor. The smaller the line width, the smaller the cross-sectional area, and the greater the resistance. Therefore, when the conditions are basically the same, the resistance of the lead used as the wiring may be much greater than the resistance of the second electrode 301 used as the driving electrode.

Therefore, in the disclosed embodiments, the flexible circuit board 40 configured to provide the driving voltage signal to the fingerprint recognition module 000 and to read the fingerprint detection signal may be directly bonded and connected to the second electrodes 301, and the lead may not be used in the module structure, which may effectively avoid the loss of the driving signal transmitted between the flexible circuit board 40 and the second electrode 301 and serious power loss due to large impedance of lead, thereby reducing the power loss of the fingerprint recognition module 000, achieving ultrasonic fingerprint recognition, and improving recognition performance.

In addition, in the disclosed fingerprint recognition module 000, the plurality of first electrodes 101 of the first electrode layer 10 may be arranged in an array of multiple rows and multiple columns, while the plurality of second electrodes 301 of the second electrode layer 30 may be arranged in an array of one row and multiple columns. In other words, along the second direction Y, there may be merely one row of second electrodes 301; and along the first direction X, a plurality of second electrodes 301 may be arranged in sequence. Optionally, one second electrode 301 in the disclosed embodiments may overlap at least two first electrodes 101. In one embodiment, a quantity of the second electrodes 301 of the second electrode layer 30 may be more than one, and the plurality of second electrodes 301 may be arranged along the first direction X.

In the second direction, each second electrode 301 may be directly bonded to the flexible circuit board 40 for electrical connection. Therefore, when performing fingerprint recognition, each second electrode 301 may be driven separately. In other words, when a touch event occurs, the flexible circuit board 40 may merely provide alternating current signal to the second electrode 301 involved in the touch event, and may not provide signals to the remaining second electrodes 301. Therefore, merely the driving voltage applied between the first electrode 101 and the second electrode 301 located at a position where the touch event occurs may change constantly, such that the piezoelectric layer 20 may vibrate and generate ultrasonic waves. Because the fingerprint includes valleys and ridges, vibration intensities of ultrasonic waves reflected by the fingerprint back to the piezoelectric layer 20 may be different, and the electrical signals generated by the ultrasonic waves reflected by valleys and ridges of the fingerprint back to the piezoelectric layer 20 may change differently. According to the voltage signals that change differently, the positions of the valleys and the ridges of the fingerprint may be determined, the determination result may be fed back to the first electrodes 101 located at the position where the touch event occurs, and may be ultimately read and be converted to a fingerprint image by the flexible circuit board 40, to achieve the fingerprint recognition.

Therefore, in one embodiment, a quantity of the second electrodes 301 of the second electrode layer 30 may be more than one, and the plurality of second electrodes 301 may be arranged along the first direction X. In the second direction, each second electrode 301 may be directly bonded to the flexible circuit board 40 for electrical connection, and the lead may not be used in the module structure, which may effectively avoid the loss of the driving signal transmitted between the flexible circuit board 40 and the second electrode 301 and serious power loss due to large impedance of lead, thereby reducing the power loss of the fingerprint recognition module 000, achieving ultrasonic fingerprint recognition, and improving recognition performance. Further, when the touch event occurs, the flexible circuit board 40 may merely provide the alternating current signal to the second electrode 301 involved in the touch event, and may not provide the signals to the remaining second electrodes 301. Therefore, the power supply area may be reduced, and the capacitive load during driving process may be reduced, which may facilitate to further reduce the power consumption.

It should be understood that for illustrative purposes, FIG. 1 and FIG. 2 merely illustrate schematic diagrams illustrating the structure of the fingerprint recognition module 000, and any other structure may also be included, which may not be limited by the present disclosure. Optionally, both the first electrode layer 10 and the second electrode layer 30 may be made of a metal material, and, thus, the first electrode 101 and the second electrode 301 may be made of the metal material. The metal material may not only have desired electrical conductivity, but also have desired bonding connection effect between the second electrodes 301 and the flexible circuit board 40. In one embodiment, the piezoelectric layer 20 may be made of a piezoelectric material with a substantially high piezoelectric voltage constant, such as polyvinylidene fluoride (PVDF), such that the fingerprint recognition module 000 in the disclosed embodiments may have a substantially high receiving sensitivity to ultrasonic waves, which may facilitate to improve fingerprint recognition performance.

Figure 3:
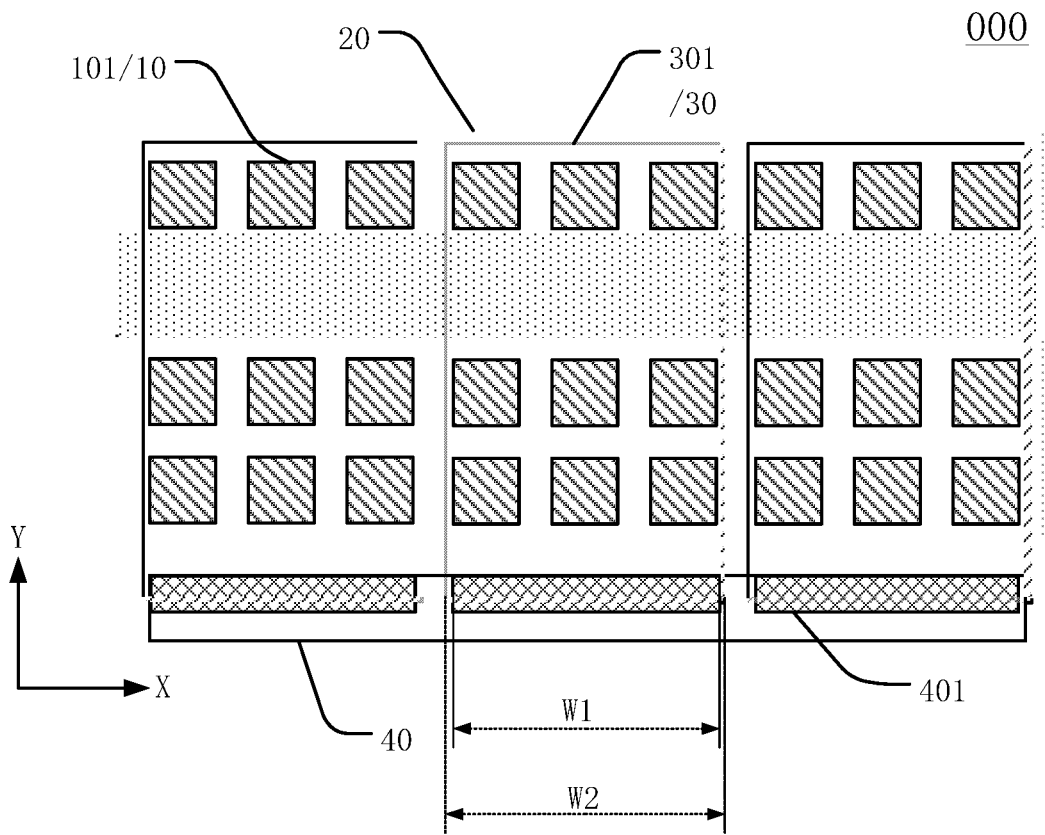
FIG. 3 illustrates a schematic top-view of another exemplary fingerprint recognition module consistent with disclosed embodiments of the present disclosure.

FIG. 3 illustrates a schematic top-view of another fingerprint recognition module consistent with disclosed embodiments of the present disclosure. For illustrative purposes, to clearly illustrate the positional relationship between the first electrode layer and the second electrode layer, FIG. 3 illustrates a transparency filling. In certain embodiments, referring to FIGS. 1-3, the flexible circuit board 40 may include a plurality of pins 401, and one second electrode 301 may be bonded and connected to one pin 401.

The disclosed embodiments may explain that the second electrode 301 may be extended all the way to the region where the flexible circuit board 40 is located and may partially overlap the flexible circuit board 40. For achieving the direct bonding connection between the flexible circuit board 40 and the second electrode 301, the flexible circuit board 40 may include the plurality of pins 401, and one second electrode 301 may be bonded and connected to one pin 401 (as shown in FIG. 3), such that the driving signals may be provided to each second electrode 301, respectively.

Optionally, along the first direction X, a ratio of a width W1 of the pin 401 over a width W2 of the second electrode 301 may be in a range of approximately 0.9-1.1. In other words, along the first direction X, the width W1 of the pin 401 may be approximately equal to the width W2 of the second electrode 301, which may facilitate the bonding connection between the second electrode 301 and the pin 401 of the flexible circuit board 40 when the second electrode 301 is extended along the second direction Y to the region where the flexible circuit board 40 is located.

Optionally, considering the process deviation, along the first direction X, the ratio of the width W1 of the pin 401 over the width W2 of the second electrode 301 may be in a range of approximately 0.9-1. In other words, the width W1 of the pin 401 may be slightly smaller than the width W2 of the second electrode 301.

Figure 4:
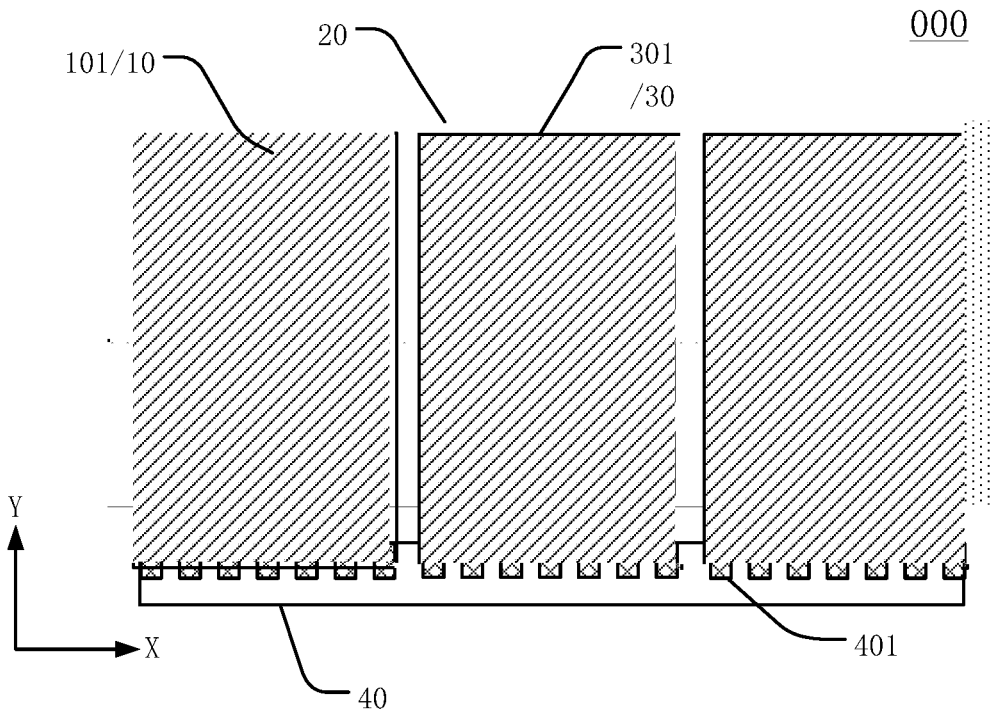
FIG. 4 illustrates a schematic top-view of another exemplary fingerprint recognition module consistent with disclosed embodiments of the present disclosure.

FIG. 4 illustrates a schematic top-view of another fingerprint recognition module consistent with disclosed embodiments of the present disclosure. For illustrative purposes, to clearly illustrate the positional relationship between the first electrode layer and the second electrode layer, FIG. 4 illustrates a transparency filling. In certain embodiments, referring to FIGS. 1-2 and FIG. 4, the flexible circuit board 40 may include a plurality of pins 401, and one second electrode 301 may be bonded and connected to multiple pins 401 of the plurality of pins 401 arranged at intervals.

The disclosed embodiments may explain that the second electrode 301 may be extended all the way to the region where the flexible circuit board 40 is located and may partially overlap the flexible circuit board 40. For achieving the direct bonding connection between the flexible circuit board 40 and the second electrode 301, the flexible circuit board 40 may include a plurality of pins 401, and one second electrode 301 may be bonded and connected to the multiple pins 401 arranged at intervals (as shown in FIG. 4).

Because in the manufacturing process, a high-temperature process is adopted to achieve the bonding and electrical connection between the second electrode 301 and the pin 401 of the flexible circuit board 40, the pin 401 may undergo thermal expansion when being subjected to a high temperature. Therefore, through configuring one second electrode 301 to be bonded and connected to the multiple pins 401 arranged at intervals, a buffer space for the thermal expansion of the pin 401 during the manufacturing process may be provided, which may facilitate to improve the bonding effect of each second electrode 301 and the flexible circuit board 40.

Figure 5:
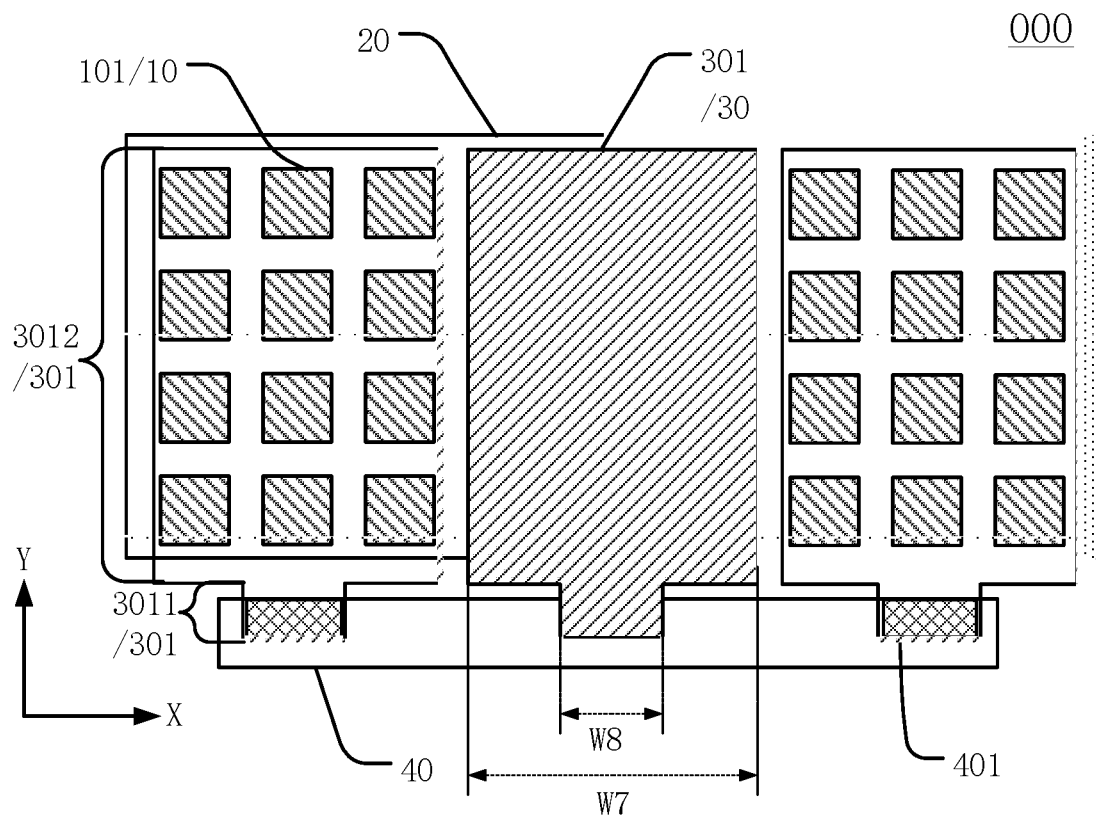
FIG. 5 illustrates a schematic top-view of another exemplary fingerprint recognition module consistent with disclosed embodiments of the present disclosure.

FIG. 5 illustrates a schematic top-view of another fingerprint recognition module consistent with disclosed embodiments of the present disclosure. For illustrative purposes, to clearly illustrate the positional relationship between the first electrode layer and the second electrode layer, FIG. 5 illustrates a transparency filling. In certain embodiments, referring to FIG. 5, the fingerprint recognition module 000 may include a plurality of second electrodes 301, and the plurality of second electrodes 301 may be arranged along the first direction X.

Each second electrode 301 may be regarded as an entity, and may include a first sub-portion 3011 and a second sub-portion 3012 that are adjacent to each other in the second direction Y. The first sub-portion 3011 may be a portion of the second electrode 302 that is bonded and connected to the flexible circuit board 40, and the second sub-portion 3012 may be the remaining portion of the second electrode 301. Along the first direction X, a width W7 of the second sub-portion 3012 may be greater than a width W8 of the first sub-portion 3011.

The disclosed embodiments may explain that the fingerprint recognition module 000 may include a plurality of second electrodes 301, and the plurality of second electrodes 301 may be arranged along the first direction X. When the flexible circuit board 40 includes a plurality of pins 401, and one second electrode 301 is bonded and connected to one pin 401, the portion where the second electrode 301 is bonded and connected to the flexible circuit board 40 may be substantially narrow, while the remaining portion may be substantially wide. In other words, each second electrode 301 may be regarded as an entity, and may include the first sub-portion 3011 and the second sub-portion 3012 that are adjacent to each other in the second direction Y. The first sub-portion 3011 may be the portion of the second electrode 302 that is bonded and connected to the flexible circuit board 40, and the second sub-portion 3012 may be the remaining portion of the second electrode 301. Along the first direction X, the width W7 of the second sub-portion 3012 may be greater than the width W8 of the first sub-portion 3011. For example, the width W8 of the first sub-portion 3011 may be ½ or ⅓, etc., of the width W7 of the second sub-portion 3012.

Therefore, while achieving the direct bonding connection between the second electrode 301 and the pin 401 of the flexible circuit board 40, the area of the pin 401 of the flexible circuit board 40 may be reduced, which may facilitate to reduce the area of the flexible circuit board 40, to save the space occupied by the flexible circuit board 40, and to achieve the miniaturization development of the entire fingerprint recognition module 000.

Figure 6:
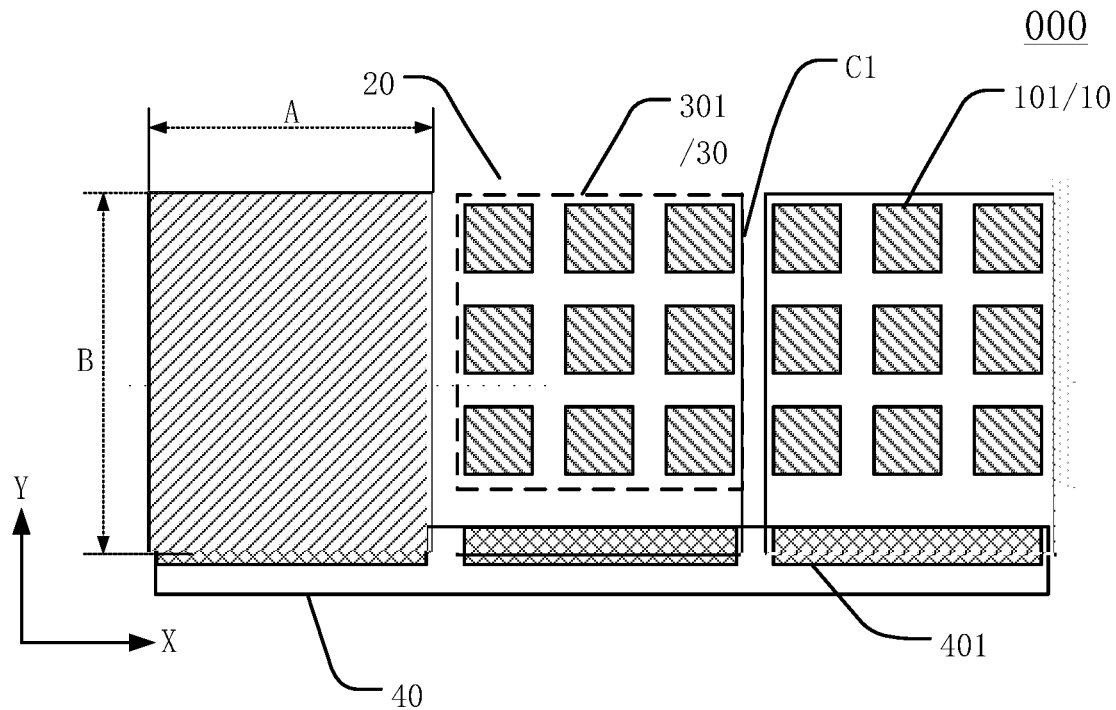
FIG. 6 illustrates a schematic top-view of another exemplary fingerprint recognition module consistent with disclosed embodiments of the present disclosure.

FIG. 6 illustrates a schematic top-view of another fingerprint recognition module consistent with disclosed embodiments of the present disclosure. For illustrative purposes, to clearly illustrate the positional relationship between the first electrode layer and the second electrode layer, FIG. 6 illustrates a transparency filling. In certain embodiments, referring to FIG. 6, the second electrode 301 may have a rectangular shape. Along the first direction X, a length of the second electrode 301 may be A; and along the second direction Y, a length of the second electrode 301 may be B, where B>A.

The disclosed embodiments may explain that each of the second electrodes 301 of the second electrode layer 30 arranged in an array of one row and multiple columns may have a rectangular shape. In other words, along the first direction X, the length of the second electrode 301 may be A, and along the second direction Y, the length of the second electrode 301 may be B, where B>A. The second electrode 301 may have a rectangle shape whose length in the second direction Y is greater than the length in the first direction X. Because the fingerprint contact region in the fingerprint recognition technology often has a square shape, in one embodiment, to reduce power loss, each second electrode 301 may be directly extended to the position where the second electrode 301 overlaps the flexible circuit board 40, and may directly overlap the flexible circuit board 40. Therefore, through configuring the second electrode 301 to have a rectangular shape, after removing the portion that is bonded to and overlaps the flexible circuit board 40, the remaining portion of each second electrode 301 may form a square structure as much as possible, which may facilitate to meet the shape and size requirements required for fingerprint recognition.

Optionally, referring to FIG. 6, the area required to identify fingerprint may often be approximately 25 mm². Therefore, when a touch event occurs, if the touch subject such as a finger is merely located on one second electrode 301, the length A of the second electrode 301 along the first direction X may be approximately 4 mm-5 mm, and the length B of the second electrode 301 along the second direction Y may be approximately 6 mm-8 mm. The area occupied by the flexible circuit board 40 in the second direction Y may be reduced, which may facilitate to increase the area of fingerprint recognition region. In one embodiment, when a touch event occurs, the flexible circuit board 40 may merely provide an alternating current signal to the second electrode 301 involved in the touch event, and may not provide signals to the remaining second electrodes 301. Therefore, the power supply area may be reduced, and the capacitive load during driving process may be reduced, which may facilitate to further reduce the power consumption. Further, after removing the portion that is bonded to and overlaps the flexible circuit board 40, the remaining portion of each second electrode 301 may form a square structure as much as possible, and the area of the remaining portion may be approximately 25 mm² as much as possible, which may facilitate to meet the area required for identifying one fingerprint.

Figure 7:
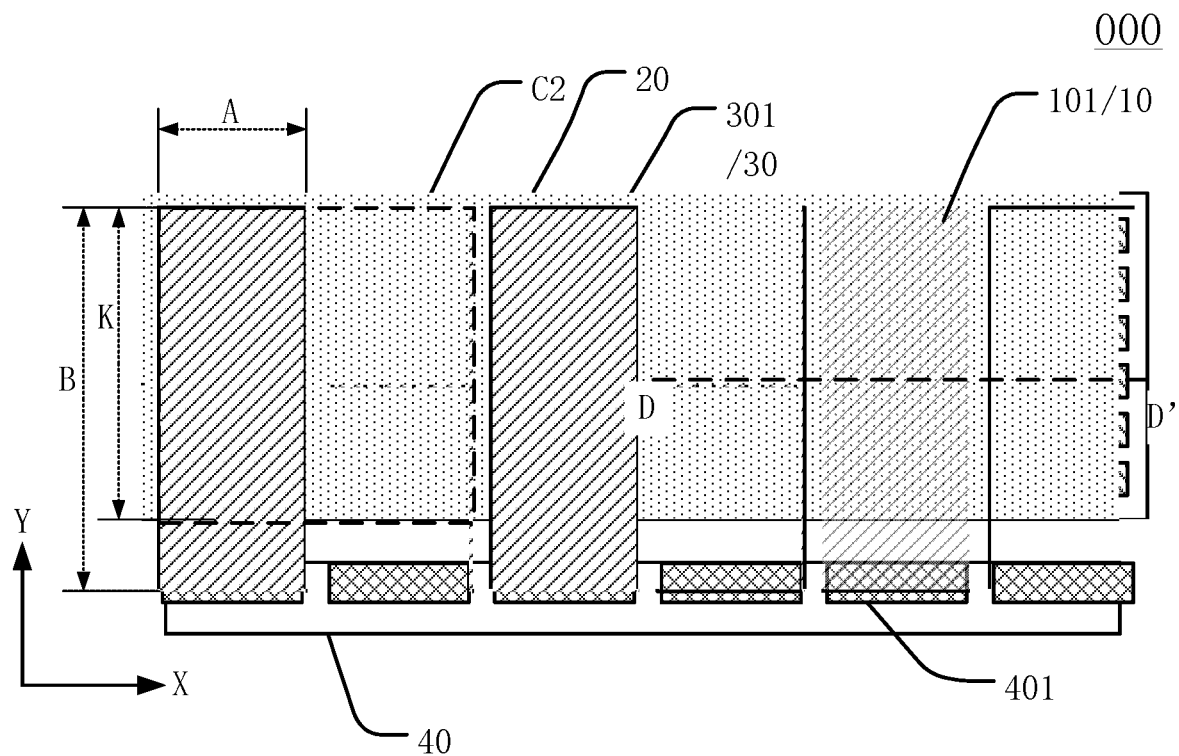
FIG. 7 illustrates a schematic top-view of another exemplary fingerprint recognition module consistent with disclosed embodiments of the present disclosure.

FIG. 7 illustrates a schematic top-view of another fingerprint recognition module consistent with disclosed embodiments of the present disclosure. For illustrative purposes, to clearly illustrate the positional relationship between the first electrode layer and the second electrode layer, FIG. 7 illustrates a transparency filling. In certain embodiments, referring to FIG. 7, the second electrode 301 may have a rectangular shape. Along the first direction X, a length of the second electrode 301 may be A; and along the second direction Y, a length of the second electrode 301 may be B, where B>A. In view of this, along the second direction Y, a length of the fingerprint recognition region (i.e., the region that is capable of achieving fingerprint detection when the touch subject touches the fingerprint recognition module) of the fingerprint recognition module 000 may be K, where B>K. Along the first direction X, the length A of the second electrode 301 may satisfy 2 mm $\leqslant$ A $\leqslant$ 5 mm. Along the second direction Y, the length B of the second electrode 301 may satisfy B>5 mm. Optionally, the length B of the second electrode 301 along the second direction Y may be in a range of approximately 6 mm-8 mm.

The disclosed embodiments may explain that each of the second electrodes 301 of the second electrode layer 30 arranged in an array of one row and multiple columns may have a rectangular shape. Along the first direction X, the length A of the second electrode 301 may satisfy 2 mm $\leqslant$ A $\leqslant$ 5 mm. Along the second direction Y, the length B of the second electrode 301 may satisfy B>5 mm. Optionally, the length B of the second electrode 301 along the second direction Y may be in a range of approximately 6 mm-8 mm. The area occupied by the flexible circuit board 40 in the second direction Y may be reduced, which may facilitate to increase the area of the fingerprint recognition region.

In one embodiment, when a touch event occurs, if the touch subject such as a finger is located on two second electrodes 301, the flexible circuit board 40 may merely provide an alternating current signal to the two second electrodes 301 involved in the touch event, and may not provide signals to the remaining second electrodes 301. Therefore, the power supply area may be reduced, and the capacitive load during driving process may be reduced, which may facilitate to further reduce the power consumption. Further, after removing the portion that is bonded to and overlaps the flexible circuit board 40, the remaining portion (region C2 shown in FIG. 7) of the two second electrodes 301 involved in the touch event may form a square structure as much as possible, and the sum of areas of the remaining portion of the two second electrodes 301 may be approximately 25 mm² as much as possible, which may facilitate to meet the area required for identifying one fingerprint.

Figure 8:
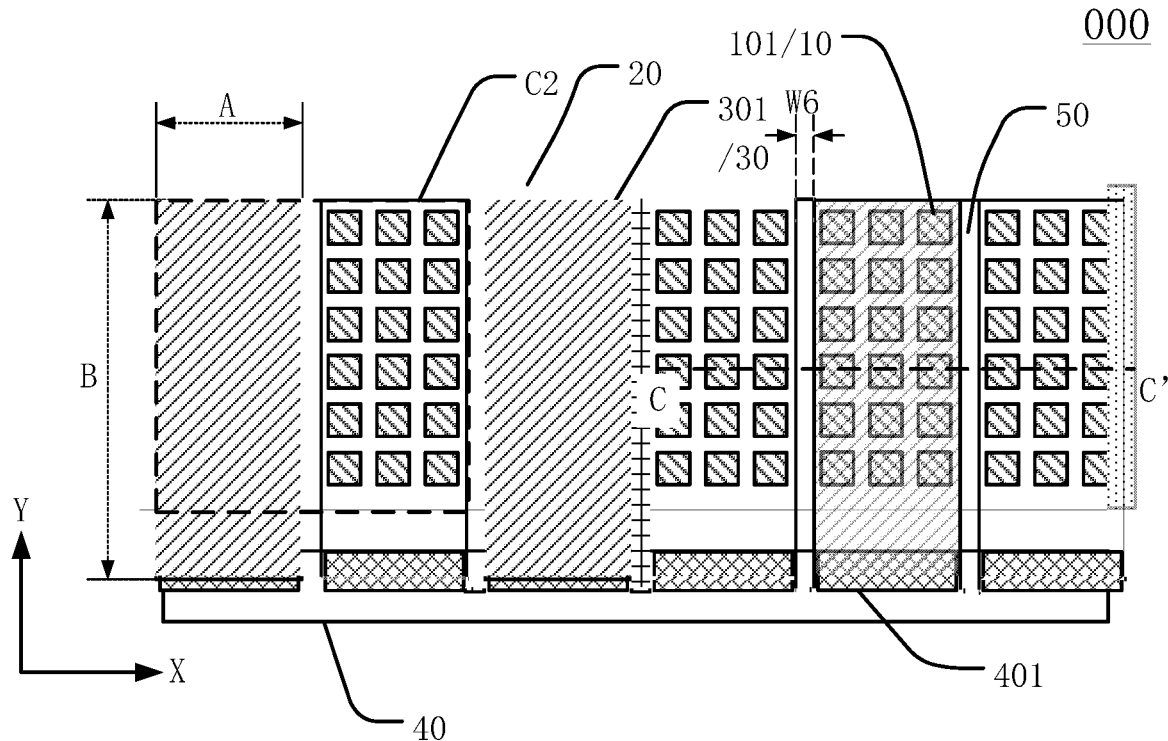
FIG. 8 illustrates a schematic top-view of another exemplary fingerprint recognition module consistent with disclosed embodiments of the present disclosure.
Figure 9:
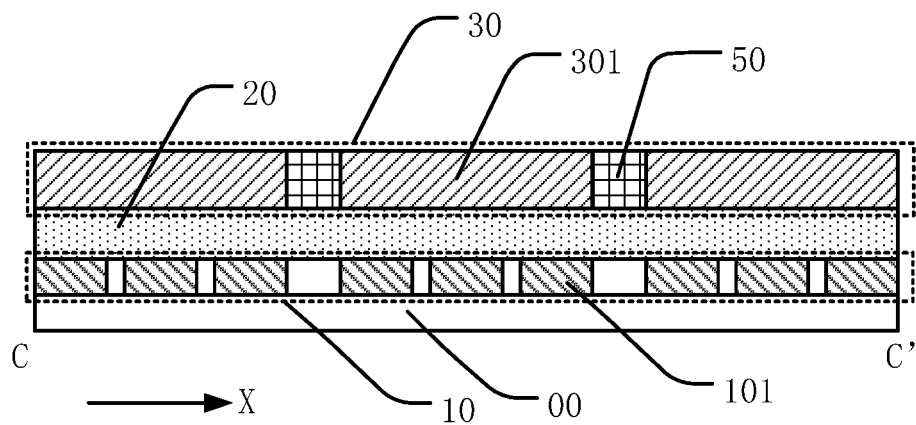
FIG. 9 illustrates a schematic C-C' sectional view of an exemplary fingerprint recognition module in FIG. 8 consistent with disclosed embodiments of the present disclosure.

FIG. 8 illustrates a schematic top-view of another fingerprint recognition module consistent with disclosed embodiments of the present disclosure; and FIG. 9 illustrates a schematic C-C' sectional view of the fingerprint recognition module in FIG. 8. For illustrative purposes, to clearly illustrate the positional relationship between the first electrode layer and the second electrode layer, FIG. 8 illustrates a transparency filling. In certain embodiments, referring to FIG. 8 and FIG. 9, in the fingerprint recognition module, a barrier spacer 50 may be disposed between adjacent two second electrodes 301.

The disclosed embodiments may explain that the plurality of first electrodes 101 of the first electrode layer 10 may be arranged in an array of multiple rows and multiple columns, while the plurality of second electrodes 301 of the second electrode layer 30 may be arranged in an array of one row and multiple columns. In other words, along the second direction Y, there may be merely one row of second electrodes 301; and along the first direction X, the plurality of second electrodes 301 may be arranged in sequence. Optionally, one second electrode 301 in the disclosed embodiments may overlap at least two first electrodes 101. In one embodiment, a quantity of the second electrodes 301 of the second electrode layer 30 may be more than one, and the plurality of second electrodes 301 may be arranged along the first direction X. In the second direction, each second electrode 301 may be directly bonded to the flexible circuit board 40 for electrical connection.

When the touch event occurs, the flexible circuit board 40 may merely provide the alternating current signal to the second electrode 301 involved in the touch event, and may not provide the signals to the remaining second electrodes 301. Therefore, the power supply area may be reduced, and the capacitive load during driving process may be reduced, which may facilitate to further reduce the power consumption. Moreover, when the plurality of second electrodes 301 are arranged along the first direction X, the barrier spacer 50 may be disposed between adjacent two second electrodes 301 to insulate the adjacent two second electrodes 301 from each other. Further, the barrier spacer 50 may fill and level up a gap between the adjacent two second electrodes 301, which may facilitate the flatness of the entire fingerprint recognition module 000.

Optionally, referring to FIG. 8, the barrier spacer 50 may be extended along the second direction Y, and an orthographic projection of the barrier spacer 50 on a plane of the flexible circuit board 40 may at least partially overlap the flexible circuit board 40.

The disclosed embodiments may explain that the barrier spacer 50 configured to insulate the two second electrodes 301 may be extended along the second direction Y to a position where the second electrode overlaps the flexible circuit board 40, which may fill and level up the gap between adjacent two pins 401 of the flexible circuit board 40, and may facilitate to improve the bonding yield of the second electrodes 301 and the flexible circuit board 40.

In certain embodiments, the second electrode layer 30 may be formed by a vacuum process such as a sputtering process. The second electrode layer 30 formed by the sputtering process may be substantially thin, in view of this, the barrier spacer 50 may not be disposed between adjacent two second electrodes 301, which may facilitate to reduce the process steps and improve the process efficiency.

Figure 10:
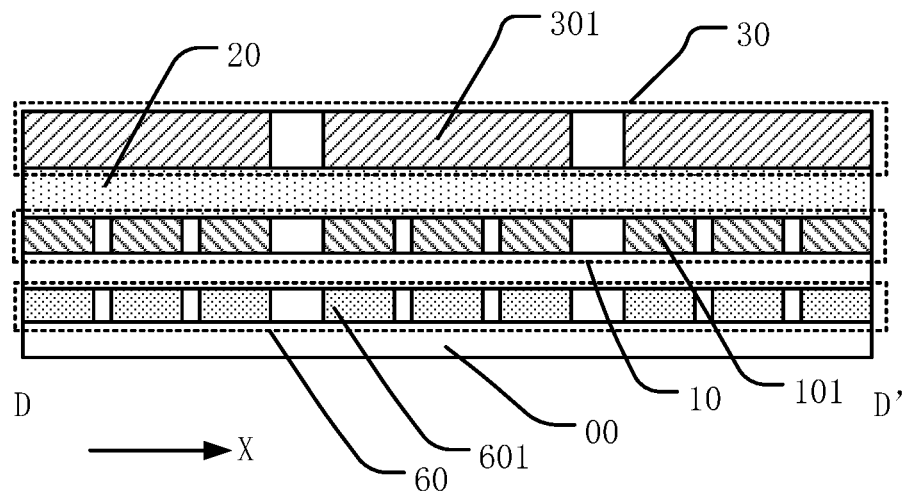
FIG. 10 illustrates a schematic D-D' sectional view of an exemplary fingerprint recognition module in FIG. 7 consistent with disclosed embodiments of the present disclosure.

FIG. 10 illustrates a schematic D-D' sectional view of the fingerprint recognition module in FIG. 7. In certain embodiments, referring to FIG. 7 and FIG. 10, the fingerprint recognition module 000 may also include a driving circuit layer 60. The driving circuit layer 60 may be electrically connected to the first electrode layer 10 (the electrical connection relationship may not be shown in FIG. 10). It should be understood that an insulating layer may be disposed between the driving circuit layer 60 and the first electrode layer 10, which may not be filled in FIG. 10. Optionally, the driving circuit layer 60 may be disposed between the substrate 00 and the first electrode layer 10, to achieve electrical connection with the first electrode layer 10.

The driving circuit layer 60 may include a plurality of driving circuits 601, and the plurality of driving circuits 601 may be arranged in an array. FIG. 10 illustrates the driving circuit using a block diagram. In specific implementation, the structure of the driving circuit 601 formed in the driving circuit layer 60 may include circuit connection structures such as a transistor, a capacitor, and a signal line, etc., as long as the driving circuit 601 is capable of achieving the fingerprint recognition function with ultrasonic technology, which may not be limited by the present disclosure. Optionally, the driving circuits 601 of the driving circuit layer 60 may be electrically connected to the first electrodes 101 in a one-to-one correspondence.

In a plane parallel to the first electrode layer 10, the interval between adjacent two second electrodes 301 may be located between adjacent two columns of driving circuits 601.

The disclosed embodiments may explain that the driving signal between the first electrode 101 and the second electrode 301 may be provided by each driving circuit 601 of the driving circuit layer 60. Optionally, the driving circuit layer 60 may be disposed between the substrate 00 and the first electrode layer 10, to achieve the electrical connection with the first electrode layer 10. In the plane parallel to the first electrode layer 10, the interval between the adjacent two second electrodes 301 may be disposed between adjacent two columns of driving circuits 601. Therefore, the interval between the adjacent two second electrodes 301 may not involve the driving circuit 601, which may facilitate to produce a desired driving induction relationship between the second electrode 301 and each corresponding driving circuit 601.

When a touch event occurs, the flexible circuit board 40 may merely provide an alternating current signal and each driving signal to the second electrode 301 involved in the touch event through the driving circuit 601, and may not provide signals to the remaining electrodes 301. Therefore, merely the driving voltage applied between the first electrode 101 and the second electrode 301 located at a position where the touch event occurs may change constantly, such that the piezoelectric layer 20 may vibrate and generate ultrasonic waves. Because the fingerprint includes valleys and ridges, vibration intensities of ultrasonic waves reflected by the fingerprint back to the piezoelectric layer 20 may be different, and the electrical signals generated by the ultrasonic waves reflected by valleys and ridges of the fingerprint back to the piezoelectric layer 20 may change differently. According to the voltage signals that change differently, the positions of the valleys and ridges of the fingerprint may be determined, the determination result may be fed back to the first electrodes 101 located at the position where the touch event occurs, and may be ultimately read and be converted to a fingerprint image by the flexible circuit board 40 through the driving circuit 601, to achieve the fingerprint recognition.

Figure 11:
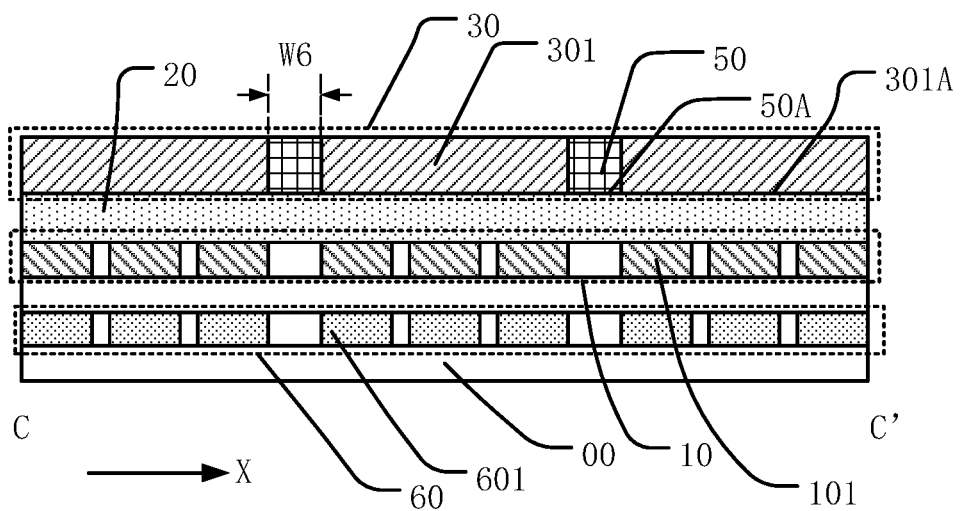
FIG. 11 illustrates a schematic C-C' sectional view of another exemplary fingerprint recognition module in FIG. 8 consistent with disclosed embodiments of the present disclosure.

FIG. 11 illustrates a schematic C-C' sectional view of the fingerprint recognition module in FIG. 8. In certain embodiments, referring to FIG. 8 and FIG. 11, the fingerprint recognition module 000 may further include a driving circuit layer 60. The driving circuit layer 60 may be electrically connected to the first electrode layer 10 (the electrical connection relationship may not be shown in FIG. 11). It should be understood that an insulating layer may be disposed between the driving circuit layer 60 and the first electrode layer 10, which may not be filled in FIG. 11. Optionally, the driving circuit layer 60 may be disposed between the substrate 00 and the first electrode layer 10, to achieve electrical connection with the first electrode layer 10. An insulating barrier spacer 50 may be disposed between adjacent two second electrodes 301.

The driving circuit layer 60 may include a plurality of driving circuits 601, and the plurality of driving circuits 601 may be arranged in an array. FIG. 11 illustrates the driving circuit using a block diagram. In specific implementation, the structure of the driving circuit 601 formed in the driving circuit layer 60 may include circuit connection structures such as a transistor, a capacitor, and a signal line, etc., as long as the driving circuit 601 is capable of achieving the fingerprint recognition function with ultrasonic technology, which may not be limited by the present disclosure. Optionally, the driving circuits 601 in the driving circuit layer 60 may be electrically connected to the first electrodes 101 in a one-to-one correspondence.

In the plane parallel to the first electrode layer 10, the barrier spacer 50 between adjacent two second electrodes 301 may be located between adjacent two columns of driving circuits 601.

The disclosed embodiments may explain that the driving signal between the first electrode 101 and the second electrode 301 may be provided by each driving circuit 601 of the driving circuit layer 60. Optionally, the driving circuit layer 60 may be disposed between the substrate 00 and the first electrode layer 10, to achieve the electrical connection with the first electrode layer 10. In the plane parallel to the first electrode layer 10, the barrier spacer 50 between the adjacent two second electrodes 301 may be located between adjacent two columns of driving circuits 601. Therefore, the barrier spacer 50 may be prevented from overlapping the driving circuit 601 as much as possible, which may facilitate to produce a desired driving induction relationship between the second electrode 301 and each corresponding driving circuit 601.

When a touch event occurs, the flexible circuit board 40 may merely provide an alternating current signal and each driving signal to the second electrode 301 involved in the touch event through the driving circuit 601, and may not provide signals to the remaining electrodes 301. Therefore, merely the driving voltage applied between the first electrode 101 and the second electrode 301 located at a position where the touch event occurs may change constantly, such that the piezoelectric layer 20 may vibrate and generate ultrasonic waves. Because the fingerprint includes valleys and ridges, vibration intensities of ultrasonic waves reflected by the fingerprint back to the piezoelectric layer 20 may be different, and the electrical signals generated by the ultrasonic waves reflected by valleys and ridges of the fingerprint back to the piezoelectric layer 20 may change differently. According to the voltage signals that change differently, the positions of the valleys and ridges of the fingerprint may be determined, the determination result may be fed back to the first electrodes 101 located at the position where the touch event occurs, and may be ultimately read and be converted to a fingerprint image by the flexible circuit board 40 through the driving circuit 60, to achieve the fingerprint recognition.

It should be noted that FIG. 10 and FIG. 11 merely schematically illustrate the structure of the driving circuit layer 60. In specific implementation, the driving circuit layer 60 may also include multiple metal conductive film layers for forming transistors, capacitors, etc., of each driving circuit 601, and the structure of the multiple metal conductive film layers of the driving circuit layer 60 may not be limited by the present disclosure, and may be determined according to the actual circuit connection structure of the driving circuit 601.

Figure 12:
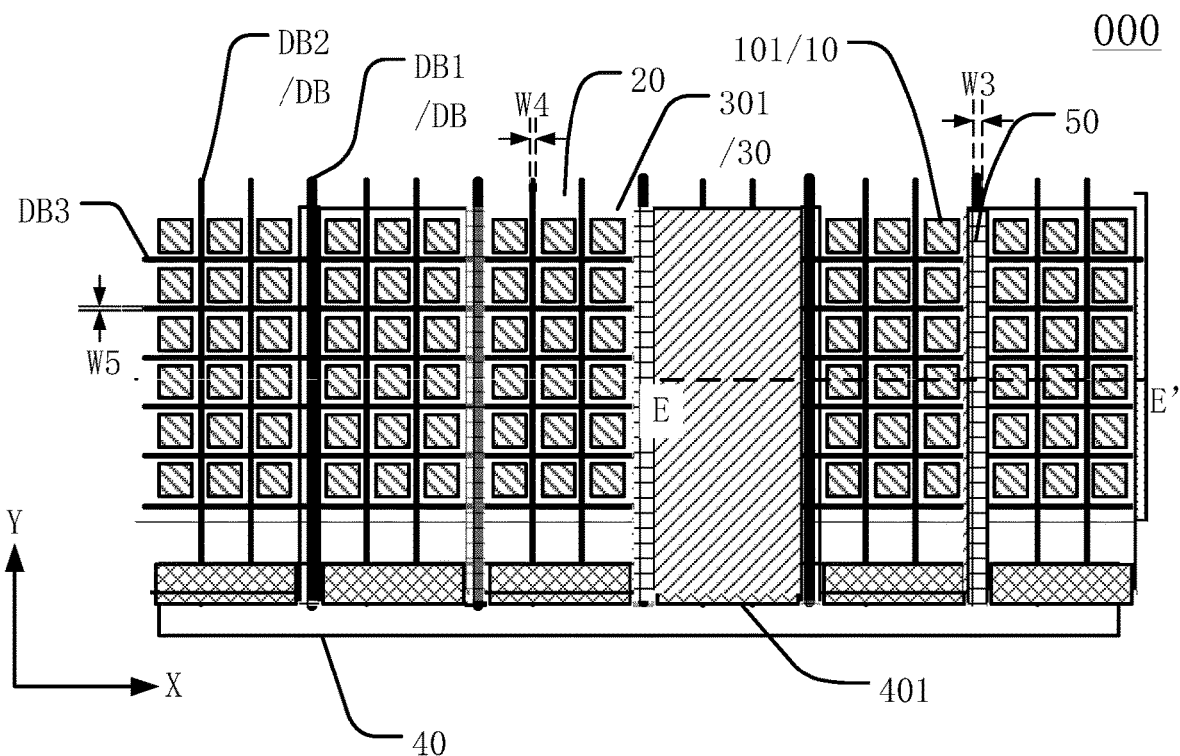
FIG. 12 illustrates a schematic top-view of another exemplary fingerprint recognition module consistent with disclosed embodiments of the present disclosure.
Figure 13:
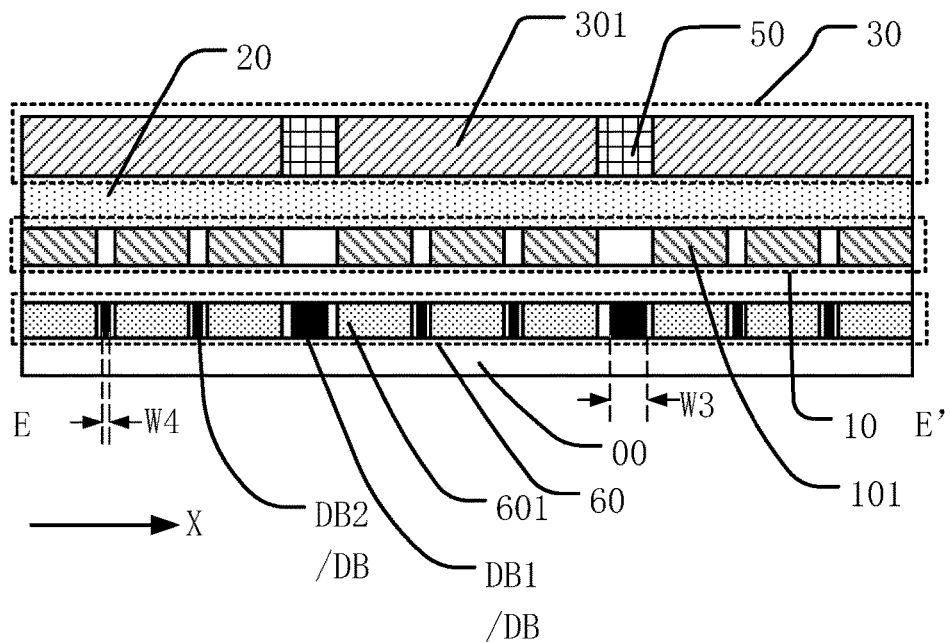
FIG. 13 illustrates a schematic E-E' sectional view of an exemplary fingerprint recognition module in FIG. 12 consistent with disclosed embodiments of the present disclosure.

FIG. 12 illustrates a schematic top-view of another fingerprint recognition module consistent with disclosed embodiments; and FIG. 13 illustrates a schematic E-E' sectional view of the fingerprint recognition module in FIG. 12. For illustrative purposes, to clearly illustrate the positional relationship between the first electrode layer and the second electrode layer, FIG. 12 illustrates a transparency filling. In certain embodiments, referring to FIG. 12 and FIG. 13, in the fingerprint recognition module 000, the driving circuit layer 60 may at least include a common signal line DB, and the common signal line DB may be extended along the second direction Y. The common signal line DB may include at least a first common signal line DB1.

An orthographic projection of the first common signal line DB1 on the plane of the first electrode layer 10 may at least partially overlap an orthographic projection of the barrier spacer 50 on the plane of the first electrode layer 10.

The disclosed embodiments may explain that the driving circuit layer 60 may include a plurality of common signal lines DB. Optionally, the common signal line DB may be electrically connected to each driving circuit 601 (not shown in the Figure), and the common signal line DB may be configured to provide a common voltage signal to each driving circuit 601. In one embodiment, the common signal line DB may be extended along the second direction Y. The orthographic projection of the first common signal line DB1 on the plane of the first electrode layer 10 may at least partially overlap the orthographic projection of the barrier spacer 50 on the plane of the first electrode layer 10. In other words, the first common signal line DB1 of the driving circuit layer 60 may be disposed at a position of the barrier spacer 50, and the barrier spacer 50 may overlap the first common signal line DB1. Because the barrier spacer 50 is configured to insulate the adjacent two second electrodes 301, the barrier spacer 50 may often have a substantially wide width in the first direction X. Therefore, the first common signal line DB1 may be disposed at the position of the barrier spacer 50, which may facilitate to further reduce the power loss by increasing the line width of the first common signal line DB1. Further, when the driving circuit 601 reads fingerprint information and performs data conversion to form a fingerprint image, charging may be uniform, which may facilitate to improve the dynamic sampling range of the driving circuit 601.

Optionally, the orthographic projection of the first common signal line DB1 on the plane of the first electrode layer 10 may merely partially overlap the orthographic projection of the barrier spacer 50 on the plane of the first electrode layer 10. Alternatively, the orthographic projection of the first common signal line DB1 on the plane of the first electrode layer 10 may be fully within a range of the orthographic projection of the barrier spacer 50 on the plane of the first electrode layer 10. In other words, the orthographic projection of the barrier spacer 50 on the plane of the first electrode layer 10 may fully cover the orthographic projection of the first common signal line DB1 on the plane of the first electrode layer 10 (as shown in FIG. 13), which may facilitate to further increase the line width of the first common signal line DB1, and may further reduce the power loss of the driving circuit 601.

In certain embodiments, referring to FIG. 12 and FIG. 13, the common signal line DB configured to provide the common voltage signal to each driving circuit 601 may further include a second common signal line DB2. An orthographic projection of the second common signal line DB2 on the plane of the first electrode layer 10 may not overlap the orthographic projection of the barrier spacer 50 on the plane of the first electrode layer 10. A line width W4 of the second common signal line DB2 may be less than the line width W3 of the first common signal line DB1.

The disclosed embodiments may explain that the driving circuits 601 in the driving circuit layer 60 may be electrically connected to the first electrodes 101 in a one-to-one correspondence. In addition to the first common signal line DB1 overlapped with the barrier spacer 50, the driving circuit layer 60 may further include a second common signal line DB2 extended along the second direction Y and disposed at an interval position between adjacent two columns of the first electrodes 101. The second common signal line DB2 may be configured to provide a common voltage signal to each driving circuit 601. Because the orthographic projection of the second common signal line DB2 on the plane of the first electrode layer 10 does not overlap the orthographic projection of the barrier spacer 50 on the plane of the first electrode layer 10, the line width W4 of the second common signal line DB2 may be less than the line width W3 of the first common signal line DB1, which may facilitate to save the layout space of the driving circuit layer 60, and may avoid reducing the space of the driving circuit layer 60 caused by disposing too many common signal lines DB with a substantially large line width, thereby facilitating the layout of the various components in the driving circuit 601 of the driving circuit layer 60.

In certain embodiments, referring to FIG. 12 and FIG. 13, the common signal line DB configured to provide the common voltage signal to each driving circuit 601 may include the first common signal line DB1 and the second common signal line DB2. Both the first common signal line DB1 and the second common signal line DB2 may be extended along the second direction Y. The orthographic projection of the first common signal line DB1 on the plane of the first electrode layer 10 may at least partially overlap the orthographic projection of the barrier spacer 50 on the plane of the first electrode layer 10. The orthographic projection of the second common signal line DB2 on the plane of the first electrode layer 10 may not overlap the orthographic projection of the barrier spacer 50 on the plane of the first electrode layer 10. The line width W4 of the second common signal line DB2 may be less than the line width W3 of the first common signal line DB1.

The driving circuit layer 60 may further include a plurality of sub-connection lines DB3, and the plurality of sub-connection lines DB3 may be connected to each other through the common signal line DB. The sub-connection line DB3 may be extended along the first direction X.

The disclosed embodiments may explain that the first common signal line DB1 and the second common signal line DB2 may be connected to each other through the sub-connection lines DB3 extended along the first direction X. In other words, the first common signal line DB1, the second common signal line DB2 and the sub-connection line DB3 may be interlaced to form a grid structure, such that merely one pin (not shown in the Figure) for providing a common voltage signal may be disposed on the flexible circuit board 40. The common voltage signal may be provided to all the driving circuits 601 of the driving circuit layer 60 through the pin for providing the common voltage signal and the sub-connection lines DB3 for connecting the first common signal line DB1 with the second common signal line DB2, which may facilitate to reduce the quantity of pins of the flexible circuit board 40, thereby reducing the occupied area of the flexible circuit board 40.

Optionally, the line width of the common signal line DB may be greater than a line width W5 of the sub-connection line DB3. The disclosed embodiments may further explain that because the sub-connection line DB3 extended along the first direction X may not be located in a region covered by the barrier spacer 50, the line width W5 of the sub-connection line DB3 may be substantially narrow. In one embodiment, the line width W5 of the sub-connection line DB3 may not only be smaller than the line width W3 of the first common signal line DB1, but also be smaller than the line width W4 of the second common signal line DB2. In another embodiment, the line width W5 of the sub-connection line DB3 may be equal to the line width W4 of the second common signal line DB2, while may be smaller than the line width W3 of the first common signal line DB1 (as shown in FIG. 12), which may prevent the sub-connection line DB3 from occupying too much space of the driving circuit layer 60.

Figure 14:
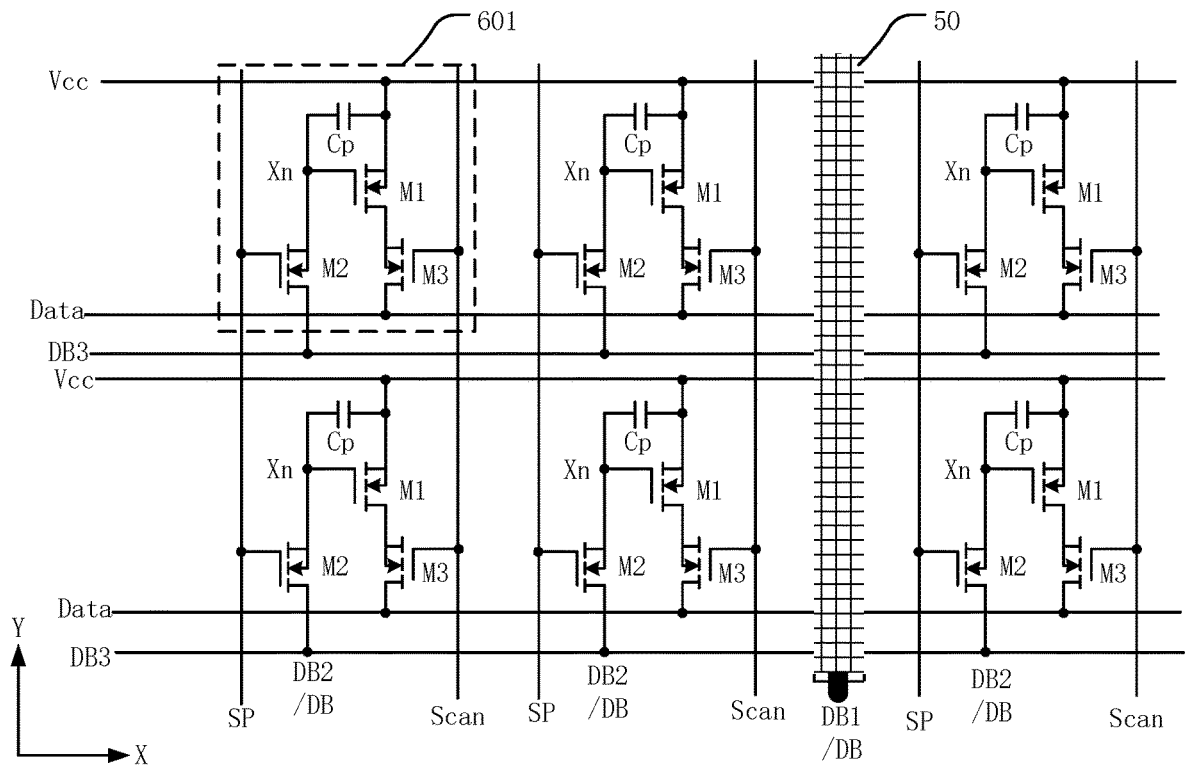
FIG. 14 illustrates a schematic diagram of an equivalent circuit connection of a plurality of driving circuits of an exemplary driving circuit layer consistent with disclosed embodiments of the present disclosure.
Figure 15:
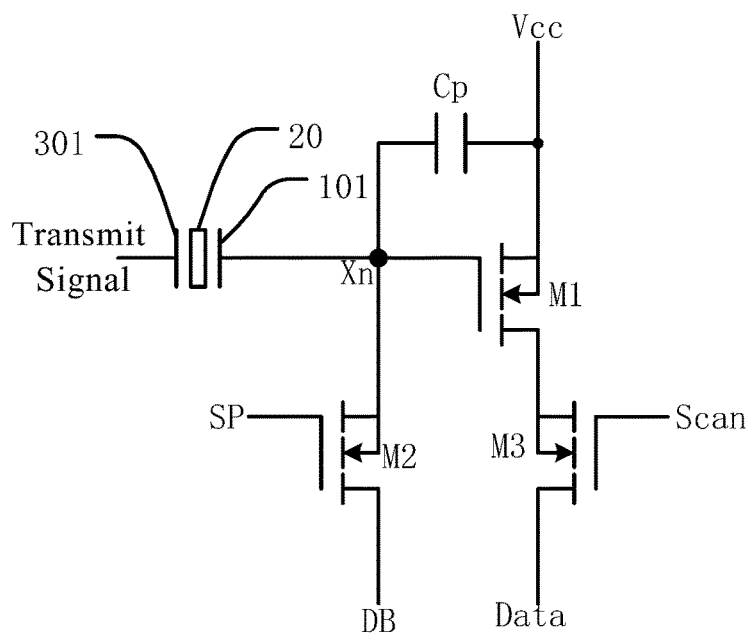
FIG. 15 illustrates a schematic diagram of a connection of a driving circuit in FIG. 14 consistent with disclosed embodiments of the present disclosure.
Figure 16:
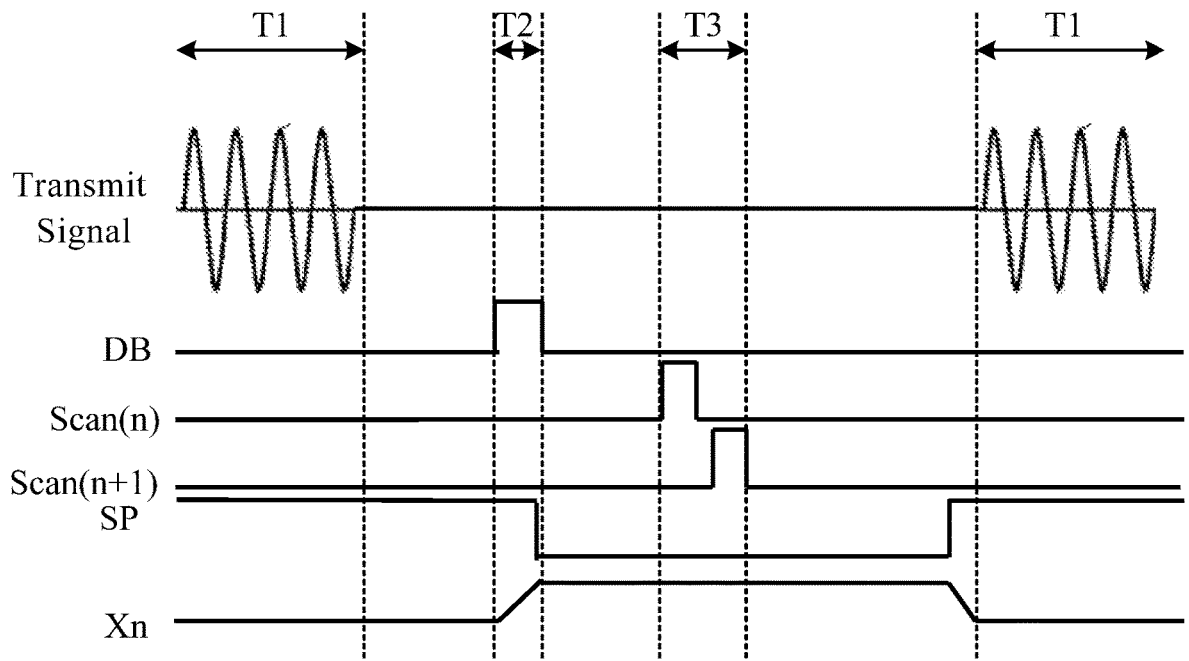
FIG. 16 illustrates an operating timing diagram of a driving circuit consistent with disclosed embodiments of the present disclosure.

FIG. 14 illustrates a schematic diagram of an equivalent circuit connection of the plurality of driving circuits of a driving circuit layer consistent with disclosed embodiments of the present disclosure; FIG. 15 illustrates a schematic diagram of a connection structure of a driving circuit in FIG. 14; and FIG. 16 illustrates an operating timing diagram of the driving circuit. In certain embodiments, referring to FIGS. 12-16, the driving circuit layer 60 may include the plurality of driving circuits 601, and may further include a scanning line Scan, a detection signal line Data, a power signal line Vcc, a sampling signal line SP, and the common signal line DB.

The driving circuit 601 may include a first transistor M1, a second transistor M2, a third transistor M3, and a storage capacitor Cp. The first electrode 101 of the first electrode layer 10 may be connected to a storage node Xn. A gate of the first transistor M1 may be connected to the storage node Xn, a first terminal of the first transistor M1 may be connected to the power signal line Vcc, and the second terminal of the first transistor M1 may be connected to a first terminal of the third transistor M3. A gate of the second transistor M2 may be connected to the sampling signal line SP, a first terminal of the second transistor M2 may be connected to the storage node Xn, and a second terminal of the second transistor M2 may be connected to the common signal line DB. A gate of the third transistor M3 may be connected to the scanning line Scan, and a second terminal of the third transistor M3 may be connected to the detection signal line Data. A first terminal of the storage capacitor Cp may be connected to the storage node Xn, and a second terminal of the storage capacitor Cp may be connected to the power signal line Vcc.

The driving circuit layer 60 may include a plurality of driving circuits 601 arranged in an array. Optionally, each driving circuit 601 may be electrically connected to one first electrode 101 of the first electrode layer 10 through the storage node Xn, to achieve the fingerprint recognition function. The driving circuit layer 60 may further include a plurality of scanning lines Scan, a plurality of detection signal lines Data, a plurality of power signal lines Vcc, a plurality of sampling signal lines SP, and a plurality of common signal lines DB. The scanning line Scan, the detection signal line Data, the power signal line Vcc, the sampling signal line SP and the common signal line DB may be electrically connected to the flexible circuit board 40, to achieve input and output of the signal.

The scanning line Scan may be configured to provide a scanning signal to the driving circuit 601, to control the turn-on and turn-off of the third transistor M3. The detection signal line Data may be configured, when the third transistor M3 is turned on, to receive the information reflecting the charges stored in the storage capacitor Cp, i.e., to receive the signal after performing the fingerprint detection. The power signal line Vcc may be configured to provide the operating power of the driving circuit 601. The sampling signal line SP may be configured to control the turn-on and turn-off of the second transistor M2. The common signal line DB may be configured to provide the common voltage signal to the driving circuit 601 when the second transistor M2 is turned on. Referring to FIG. 16, the operating stage of the driving circuit 601 may include an excitation stage T1, a sampling stage T2, and a reading stage T3.

First, in the excitation stage T1, when a touch event occurs, the flexible circuit board 40 may merely provide alternating current signal (transmit signal) to the second electrode 301 involved in the touch event, and may not provide signals to the remaining second electrodes 301. Therefore, merely the driving voltage applied between the first electrode 101 and the second electrode 301 located at a position where the touch event occurs may change constantly, such that the piezoelectric layer 20 may vibrate and generate ultrasonic waves.

In the following sampling stage T2, after the excitation stage T1 ends, the remaining shock of the ultrasonic oscillation may affect the piezoelectric layer 20 and generate electrical signals. Because the fingerprint includes valleys and ridges, vibration intensities of ultrasonic waves reflected by the fingerprint back to the piezoelectric layer 20 may be different, and the electrical signals generated by the ultrasonic waves reflected by valleys and ridges of the fingerprint back to the piezoelectric layer 20 may change differently. The electrical signals with different changes generated by the piezoelectric layer 20 may be converted into different charges stored in the storage capacitor Cp through sampling.

In the ultimate reading stage T3, according to the voltage signals that change differently, the positions of the valleys and ridges of the fingerprint may be determined, the determination result may be fed back to the first electrodes 101 located at the position where the touch event occurs. The detection signal line Data may receive the information reflecting the charges stored in the storage capacitor Cp, and the flexible circuit board 40 may read the information and may perform a data conversion to form a fingerprint image, to complete the fingerprint recognition.

The disclosed embodiments may explain that the first electrode 101 of the first electrode layer 10 may be connected to the storage node Xn, such that the fingerprint electrical signal received by the first electrode 101 may be stored in the storage capacitor Cp. A signal reading unit formed by the first transistor M1 and the third transistor M3 may be configured to read the fingerprint electrical signal stored in the storage capacitor Cp, i.e., the voltage signal received by the first electrode 101. The first terminal of the first transistor M1 may be connected to a fixed voltage inputted from the power signal line Vcc, and the gate of the third transistor M3 may be connected to the scanning line Scan. The scanning line Scan may input an instruction of whether to read the detection signal, to turn on the third transistor M3 and to output the fingerprint electrical signal stored in the storage capacitor Cp through the detection signal line Data. In the process of storing the fingerprint electrical signal received by the first electrode 101 in the storage capacitor Cp, the second transistor M2 may be turned on through the sampling signal line SP, and the common voltage signal may be applied to the second terminal of the second transistor M2 through the common signal line DB, such that the alternating current signal received by the first electrode 101 may be raised, and a fingerprint detection signal with a substantially large contrast may be obtained.

It should be understood that the disclosed embodiments may provide a connection structure of the driving circuit 601 that is capable of achieving the fingerprint recognition based on ultrasonic technology, which may not be limited to such circuit structure. In specific implementation, the circuit structure may be any other detection circuit that is capable of achieving ultrasonic fingerprint recognition, and FIG. 16 merely illustrates the operating timing diagram of the driving circuit 601 as an example. The driving circuit 601 may also be driven by any other timing according to actual conditions, which may not be repeated herein.

In certain embodiments, referring to FIGS. 12-16, the scanning line Scan may be extended along the second direction Y.

The disclosed embodiments may explain that in the driving circuit layer 60, the scanning line Scan connected to each driving circuit 601 may have an extension direction same as the second electrode 301, and both may be extended along the second direction Y. When a touch event occurs, the flexible circuit board 40 may merely provide an alternating current signal to the second electrode 301 involved in the touch event through the driving circuit 601, and the flexible circuit board 40 may merely provide the driving signal to the scanning line Scan corresponding to the second electrode 301 involved in the touch event. Therefore, the flexible circuit board 40 may merely drive multiple columns of driving circuits 601 corresponding to the second electrode 301 involved in the touch event to achieve the fingerprint recognition, which may facilitate to reduce power consumption.

In certain embodiments, referring to FIG. 8 and FIG. 11, the orthographic projection of the barrier spacer 50 on the plane of the first electrode layer 10 may not overlap the first electrode 101.

The disclosed embodiments may explain that in the plane parallel to the first electrode layer 10, the barrier spacer 50 between adjacent two second electrodes 301 may be disposed between adjacent two rows of first electrodes 101. In other words, the orthographic projection of the barrier spacer 50 on the plane of the first electrode layer 10 may not overlap the first electrode 101, such that the first electrode 101 may be prevented from overlapping the barrier spacer 50 as much as possible, which may facilitate to increase the facing area of the second electrode 301 and corresponding first electrode 101, may prevent the stagger of the first electrode 101 and the second electrode 301 from affecting the driving voltage applied between the first electrode 101 and the second electrode 301, and may facilitate to improve the accuracy of fingerprint recognition.

In certain embodiments, referring to FIG. 8 and FIG. 11, in one embodiment, along the first direction X, a width W6 of the barrier spacer 50 may be in a range of approximately 1 um-50 um.

The disclosed embodiments may explain that the barrier spacer 50 between the adjacent two second electrodes 301 may be substantially wide, and the width W6 of the barrier spacer 50 may be in a range of approximately 1 um-50 um. If the width W6 of the barrier spacer 50 is too small, the line width of the common signal line DB that overlaps the barrier spacer 50 may not effectively increase, and the power consumption may not be effectively reduced. If the width W6 of the barrier spacer 50 is too large, the layout area of the second electrode 301 may be affected. Therefore, in the present disclosure, the width of the barrier spacer 50 may be in a range of approximately 1 um-50 um, which may not only facilitate to increase the line width of the common signal line DB that overlaps the barrier spacer 50 to effectively reduce the power consumption, but also ensure the second electrode layer 30 to have sufficient space for disposing the second electrode 301 as much as possible.

In certain embodiments, referring to FIG. 8 and FIG. 11, the barrier spacer 50 may be made of a material including an organic material.

The disclosed embodiments may explain that the barrier spacer 50 may be made of a material including an organic material, such as acrylic, polyimide or any other resin material. The organic material may have desired buffering performance. While making the barrier spacer 50 have an insulating effect, the barrier spacer 50 may buffer the pressure between adjacent two second electrodes 301. In addition, in the manufacturing process, the organic material may facilitate the fabrication by coating. Therefore, in the present disclosure, the barrier spacer 50 may be made of the organic material, and a substantially thick film layer may be conveniently formed as the barrier spacer 50 in the present disclosure.

Optionally, when forming the second electrode 301 in the present disclosure, because the second electrode 301 requires high precision, and processes such as photolithography may not form a pattern with substantially high precision. In the present disclosure, when forming the second electrode 301, the barrier spacer 50 may be used to form the pattern. In other words, an organic material layer may be first coated on the piezoelectric layer 20, and a plurality of barrier spacers 50 may be formed by a photolithography process. Then, the second electrode layer 30 may be formed by a coating process. Due to the action of the barrier spacer 50, the second electrodes 301 extended along the second direction Y with high precision may be formed between adjacent barrier spacers 50. Ultimately, the second electrodes may be directly bonded and connected to the flexible circuit board 40.

In certain embodiments, referring to FIG. 8 and FIG. 11, a difference between an acoustic resistance of the material for forming the barrier spacer 50 and an acoustic resistance of the material for forming the first electrode 101 and the second electrode 301 may be less than or equal to 9 million Rayleigh (MRayl). Acoustic resistance may be acoustic impedance, which may be a characteristic of the material, and may refer to a complex ratio of the sound pressure of the medium on a certain area of the wave surface over a volume velocity passing through such area, i.e., the resistance that the medium displacement needs to overcome when the sound wave is transmitted. The greater the acoustic impedance, the greater the sound pressure required to push the medium, and the smaller the acoustic impedance, the smaller the sound pressure required to push the medium. The measured value of the acoustic impedance may often have a unit of million Rayleigh (MRayl).

The disclosed embodiments may explain that the acoustic resistance of the material for forming the barrier spacer 50 may be adjacent to the acoustic resistance of the material for forming the first electrode 101 and the second electrode 301. In other words, the difference between the acoustic resistance of the material for forming the barrier spacer 50 and the acoustic resistance of the material for forming the first electrode 101 and the second electrode 301 may be less than or equal to 9 MRayl. Therefore, when performing the ultrasonic fingerprint recognition, the phenomenon of ultrasonic waveform distortion near the barrier spacer 50 may be prevented.

In certain embodiments, referring to FIG. 8 and FIG. 11, a surface of the barrier spacer 50 adjacent to the first electrode layer 10 may be a first surface 50A, and a surface of the second electrode 301 adjacent to the first electrode layer 10 may be a second surface 301A. The first surface 50A and the second surface 301A may be disposed in a same plane.

The disclosed embodiments may explain that the first surface 50A of the barrier spacer 50 adjacent to the first electrode layer 10 and the second surface 301A of the second electrode 301 adjacent to the first electrode layer 10 may be disposed in the same plane. Therefore, the barrier spacer 50 may not be extended to the piezoelectric layer 20 as much as possible, which may prevent the barrier spacer 50 from damaging the uniformity of the piezoelectric layer 20, and may facilitate to improve the uniformity of the ultrasonic waves generated by the piezoelectric layer 20 when vibrating.

Figure 17:
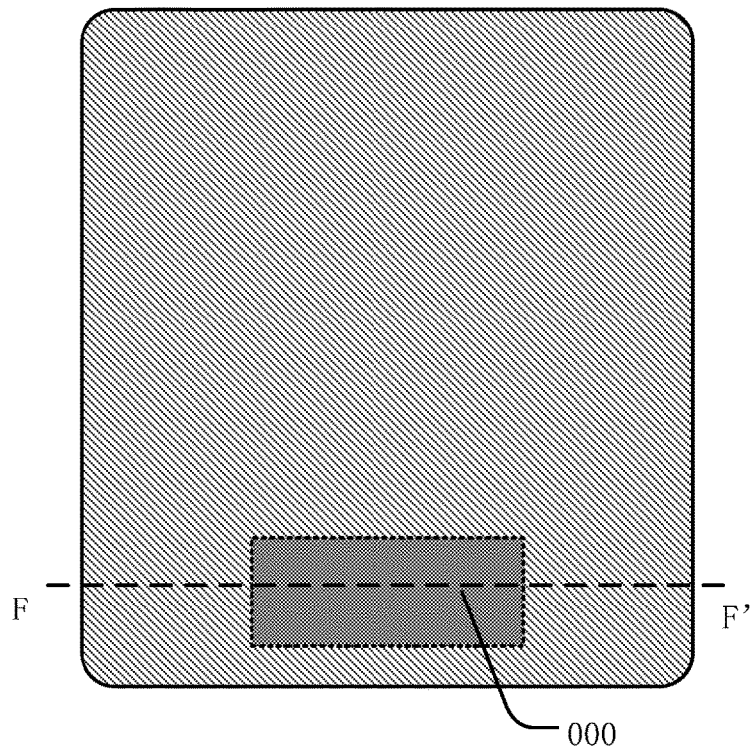
FIG. 17 illustrates a schematic diagram of an exemplary display panel consistent with disclosed embodiments of the present disclosure.

The present disclosure also provides a display panel. FIG. 17 illustrates a schematic diagram of a display panel consistent with disclosed embodiments of the present disclosure. In certain embodiments, referring to FIGS. 1-17, a display panel 111 may include the fingerprint recognition module 000 provided in the above-disclosed embodiments. For illustrative purposes, FIG. 17 illustrates a mobile phone as an example to describe the display panel 111. The display panel 111 may be a computer, a TV, a vehicle-mounted display panel, or any other display panel with a display function, which may not be limited by the present disclosure. The display panel 111 in the present disclosure may have the beneficial effects of the fingerprint recognition module 000 in the present disclosure, which may refer to specific descriptions of the fingerprint recognition module 000 in the foregoing embodiments, and may not be repeated herein.

It should be understood that for illustrative purposes, the display panel 111 may have an area different from the fingerprint recognition module 000 as an example. The fingerprint recognition module 000 may be disposed merely in the region where fingerprint recognition is required (as shown in FIG. 17), which may not be limited by the present disclosure. The area of the display panel 111 may be adjacent to or same as the area of the fingerprint recognition module 000, to achieve the full-screen fingerprint recognition.

Figure 18:
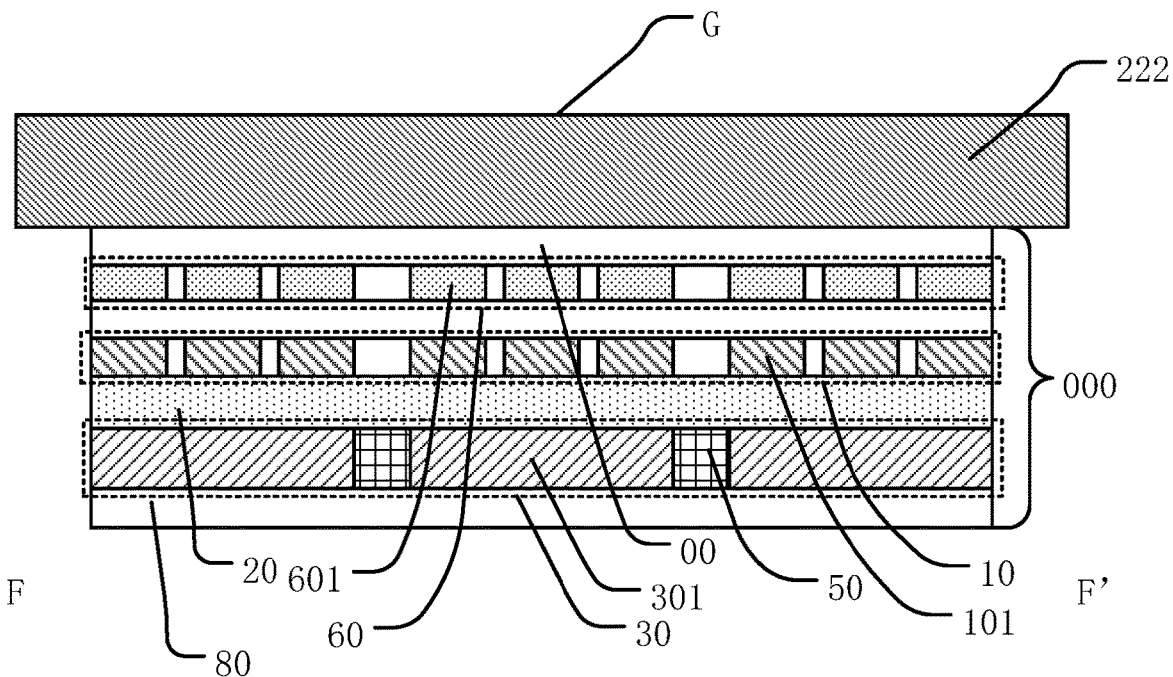
FIG. 18 illustrates a F-F' cross-sectional view of an exemplary display panel in FIG. 17 consistent with disclosed embodiments of the present disclosure.

FIG. 18 illustrates a schematic F-F' cross-sectional view of the display panel in FIG. 17. In certain embodiments, referring to FIGS. 1-18, the display panel 111 may further include a display module 222 that is disposed opposite to the fingerprint recognition module 000. In one embodiment, the display module 222 may be a liquid-crystal display module including an array substrate, a liquid-crystal layer, and a color film substrate, etc. In another embodiment, the display module 222 may be an organic light-emitting display module including an organic light-emitting layer, and an encapsulation layer, etc., which may not be limited by the present disclosure. In the display panel 111, the fingerprint recognition module 000 may be disposed on a side of the display module 222 facing away from a light-exiting surface G of the display panel 111, and the first electrode layer 10 may be disposed on a side of the second electrode layer 30 adjacent to the display module 222.

The disclosed embodiments may explain that the display panel 111 may include the fingerprint recognition module 000. The fingerprint recognition module 000 may be disposed on the side of the display module 222 facing away from the light-exiting surface G of display panel 000, and the first electrode layer 10 may be disposed on the side of the second electrode layer 30 adjacent to the display module 222. Optionally, an insulating protection layer 80 (not filled in the Figure) may be disposed on a side of the second electrode layer 30 facing away from the first electrode layer 10, to protect the fingerprint recognition module 000.

The fingerprint recognition module 000 may be disposed on the side of the display module 222 facing away from the light-exiting surface G of display panel 000, and the first electrode layer 10 may be disposed on the side of the second electrode layer 30 adjacent to the display module 222. Because the ultrasonic waves may be reflected at an interface between medium and air, through configuring the fingerprint recognition module 000 to be disposed on the side of the display module 222 facing away from the light-exiting surface G of the display panel 000, and the first electrode layer 10 to be disposed on the side of the second electrode layer 30 adjacent to the display module 222, i.e., the fingerprint recognition module 000 may be attached upside down to the display module 222, which may effectively use the reflected ultrasonic signal, thereby facilitating to improve the accuracy of fingerprint recognition.

It should be understood that the display panel 111 may be a liquid-crystal display panel, or an organic light-emitting display panel. FIG. 17 and FIG. 18 merely illustrate exemplary drawings of the structure of the display panel 111. In specific implementation, the structure of the display panel 111 may be understood with reference to the structure of the display panel in the related art.

Figure 19:
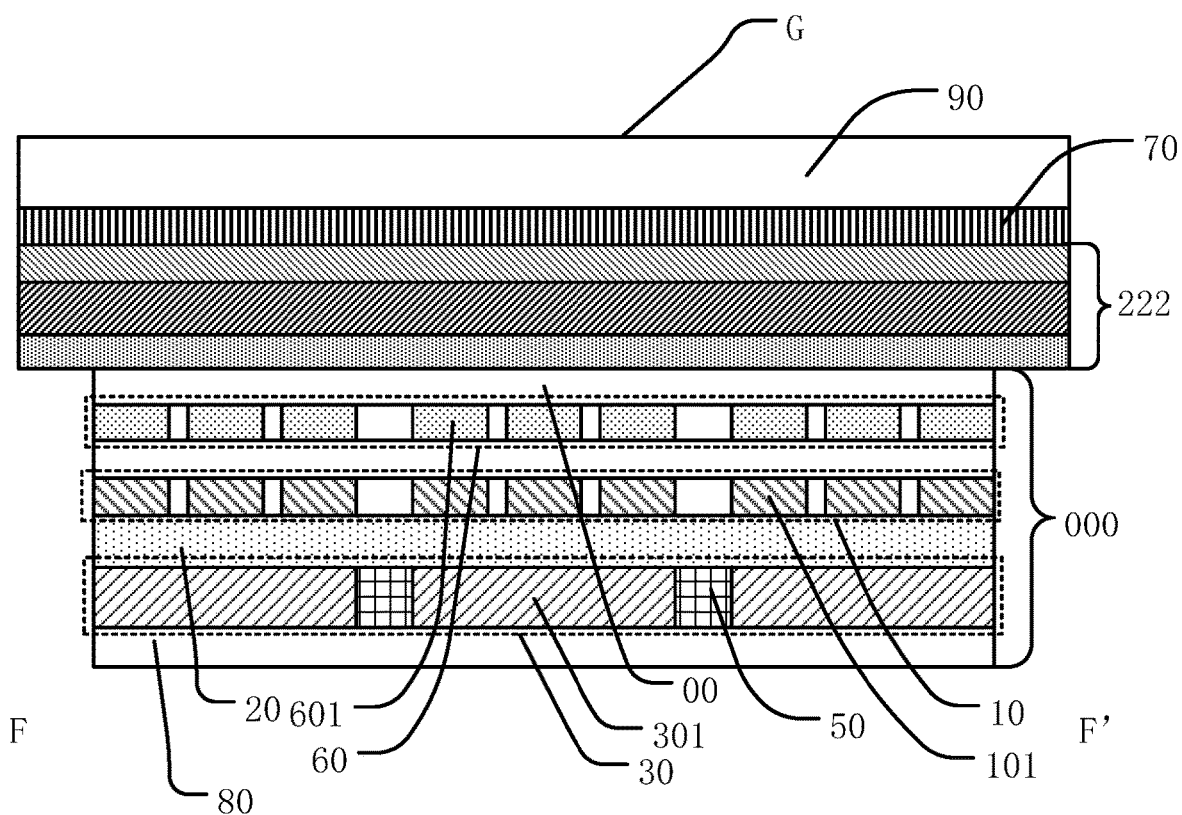
FIG. 19 illustrates a F-F' cross-sectional view of another exemplary display panel in FIG. 17 consistent with disclosed embodiments of the present disclosure.

FIG. 19 illustrates a schematic F-F' cross-sectional view of another display panel in FIG. 17. In certain embodiments, referring to FIGS. 1-17 and FIG. 19, the display panel 111 may further include a touch-control layer 70. The touch-control layer 70 may be located at a side of the display panel 111 adjacent to the light-exiting surface G. Optionally, when the display module 222 is a liquid-crystal display module including an array substrate, a liquid-crystal layer, and a color film substrate, etc., the touch-control layer 70 may be formed on a side of the color film substrate of the display module 222 facing away from the liquid-crystal layer. Optionally, when the display module 222 is an organic light-emitting display module including an organic light-emitting layer, and an encapsulation layer, etc., the touch-control layer 70 may be formed on a side of the encapsulation layer facing away from the organic light-emitting layer. A protection structure such as a cover 90 may encapsulate the touch-control layer 70 into the display panel 111 (not shown in the Figure).

The disclosed embodiments may explain that the display panel 111 may further include the touch-control layer 70, and the touch-control layer 70 may be located at the side of the display panel 111 adjacent to the light-exiting surface G, such that the display panel 111 may achieve the touch-control function. Through the touch-control layer 70, the location where the touch event occurs may be determined, to achieve the detection of the touch location. Then, through the fingerprint recognition module 000, the fingerprint recognition may be performed merely on location where the touch event occurs. Therefore, any additional touch-control device such as a capacitive touch-control panel may not need to be formed, while reducing the cost of the display panel, the fingerprint recognition may be achieved through the disclosed fingerprint recognition module 000, thereby reducing the power consumption.

Figure 20:
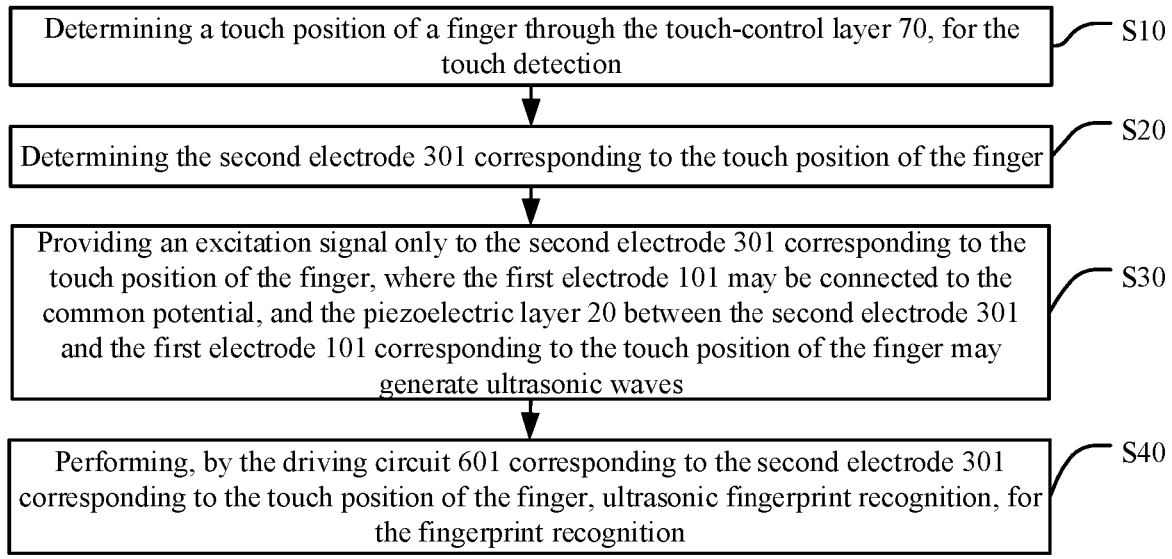
FIG. 20 illustrates a schematic flowchart of an exemplary driving method of a display panel consistent with disclosed embodiments of the present disclosure.

The present disclosure also provides a driving method of a display panel. FIG. 20 illustrates a schematic flowchart of a driving method of a display panel consistent with disclosed embodiments of the present disclosure. In certain embodiments, referring to FIGS. 1-17 and FIGS. 19-20, the driving method may be configured to drive the display panel in the present disclosure to perform the touch detection and fingerprint recognition. The driving method may include following.

In S10: determining a touch position of a finger through the touch-control layer 70, for the touch detection.

In S20: determining the second electrode 301 corresponding to the touch position of the finger.

In S30: providing an excitation signal only to the second electrode 301 corresponding to the touch position of the finger, where the first electrode 101 may be connected to the common potential, and the piezoelectric layer 20 between the second electrode 301 and the first electrode 101 corresponding to the touch position of the finger may generate ultrasonic waves.

In S40: performing, by the driving circuit 601 corresponding to the second electrode 301 corresponding to the touch position of the finger, ultrasonic fingerprint recognition, for the fingerprint recognition.

Specifically, in the disclosed driving method of the display panel, the fingerprint recognition may be performed after completing the touch detection, and each second electrode 301 may be driven separately. In other words, when a touch event occurs, the flexible circuit board 40 may merely provide alternating current signal to the second electrode 301 involved in the touch event, and may not provide signals to the remaining second electrodes 301. Therefore, merely the driving voltage applied between the first electrode 101 and the second electrode 301 located at a position where the touch event occurs may change constantly, such that the piezoelectric layer 20 may vibrate and generate ultrasonic waves. Because the fingerprint includes valleys and ridges, vibration intensities of ultrasonic waves reflected by the fingerprint back to the piezoelectric layer 20 may be different, and the electrical signals generated by the ultrasonic waves reflected by valleys and ridges of the fingerprint back to the piezoelectric layer 20 may change differently. According to the voltage signals that change differently, the positions of the valleys and ridges of the fingerprint may be determined, the determination result may be fed back to the first electrodes 101 located at the position where the touch event occurs, and may be ultimately read and be converted to a fingerprint image by the flexible circuit board 40, to achieve the fingerprint recognition. Further, when the touch event occurs, the flexible circuit board 40 may merely provide the alternating current signal to the second electrode 301 involved in the touch event, and may not provide the signals to the remaining second electrodes 301. Therefore, the power supply area may be reduced, and the capacitive load during driving process may be reduced, which may facilitate to further reduce the power consumption.

Figure 21:
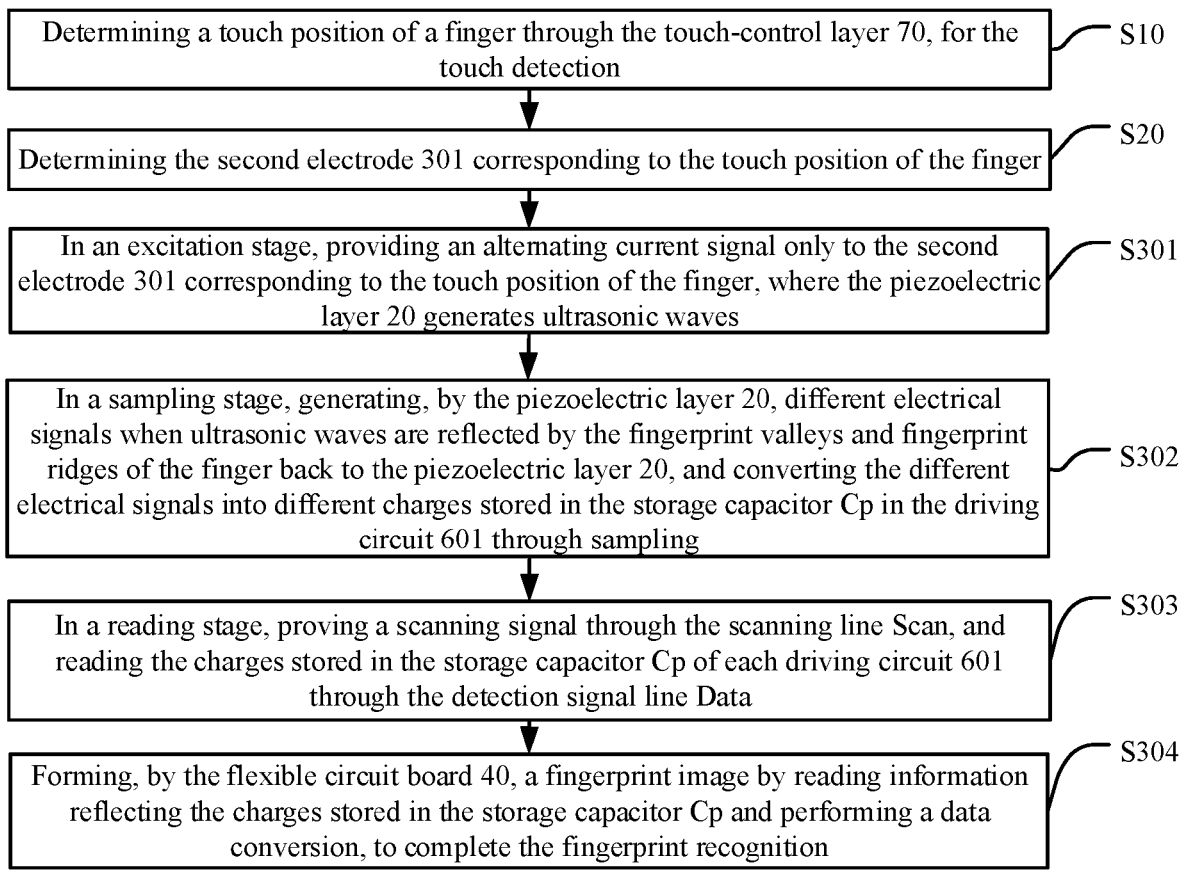
FIG. 21 illustrates a schematic flowchart of another exemplary driving method of a display panel consistent with disclosed embodiments of the present disclosure.

FIG. 21 illustrates a schematic flowchart of another driving method of a display panel consistent with disclosed embodiments of the present disclosure. In certain embodiments, referring to FIGS. 1-17, FIG. 19, and FIG. 21, the driving method may be configured to drive the display panel in the present disclosure to perform the touch detection and fingerprint recognition. The driving method may include following.

In S10: determining a touch position of a finger through the touch-control layer 70, for the touch detection.

In S20: determining the second electrode 301 corresponding to the touch position of the finger.

In S301: in an excitation stage, providing an alternating current signal only to the second electrode 301 corresponding to the touch position of the finger, where the piezoelectric layer 20 generates ultrasonic waves.

In S302: in a sampling stage, generating, by the piezoelectric layer 20, different electrical signals when ultrasonic waves are reflected by the fingerprint valleys and fingerprint ridges of the finger back to the piezoelectric layer 20, and converting the different electrical signals into different charges stored in the storage capacitor Cp in the driving circuit 601 through sampling.

In S303: in a reading stage, proving a scanning signal through the scanning line Scan, and reading the charges stored in the storage capacitor Cp of each driving circuit 601 through the detection signal line Data.

In S304: forming, by the flexible circuit board 40, a fingerprint image by reading information reflecting the charges stored in the storage capacitor Cp and performing a data conversion, to complete the fingerprint recognition.

The disclosed embodiments may explain that in the disclosed driving method of the display panel, the fingerprint recognition may be performed after completing the touch detection. After determining the position where the touch event occurs, first, in the excitation stage T1, the flexible circuit board 40 may merely provide alternating current signal (transmit signal) to the second electrode 301 involved in the touch event, and may not provide signals to the remaining second electrodes 301. Therefore, merely the driving voltage applied between the first electrode 101 and the second electrode 301 located at the position where the touch event occurs may change constantly, such that the piezoelectric layer 20 may vibrate and generate ultrasonic waves. In the following sampling stage T2, after the excitation stage T1 ends, the remaining shock of the ultrasonic oscillation may affect the piezoelectric layer 20 and generate electrical signals. Because the fingerprint includes valleys and ridges, vibration intensities of ultrasonic waves reflected by the fingerprint back to the piezoelectric layer 20 may be different, and the electrical signals generated by the ultrasonic waves reflected by valleys and ridges of the fingerprint back to the piezoelectric layer 20 may change differently. The electrical signals with different changes generated by the piezoelectric layer 20 may be converted into different charges stored in the storage capacitor Cp through sampling. In the ultimate reading stage T3, according to the voltage signals that change differently, the positions of the valleys and ridges of the fingerprint may be determined, the determination result may be fed back to the first electrodes 101 located at the position where the touch event occurs. The detection signal line Data may receive the information reflecting the charges stored in the storage capacitor Cp, and the flexible circuit board 40 may read the information and may perform the data conversion to form a fingerprint image, to complete the fingerprint recognition.

Figure 22:
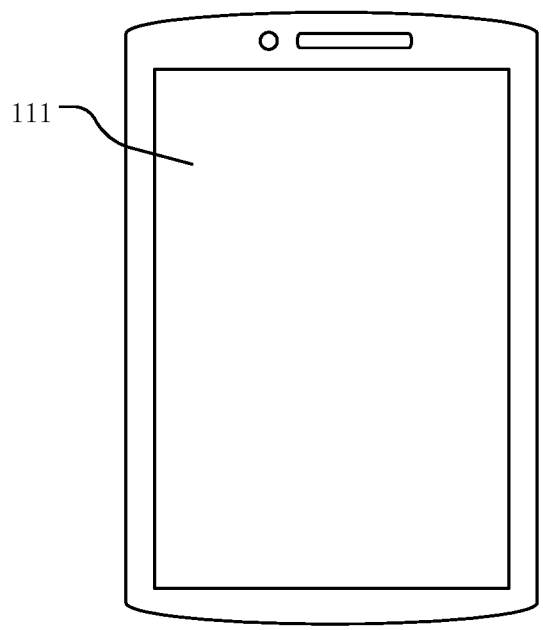
FIG. 22 illustrates a schematic top-view of an exemplary display device consistent with disclosed embodiments of the present disclosure.

The present disclosure also provides a display device. FIG. 22 illustrates a schematic top view of a display device consistent with disclosed embodiments of the present disclosure. In one embodiment, referring to FIG. 22, the display device 1111 may include the display panel 111 provided in the above-disclosed embodiments. For illustrative purposes, FIG. 22 illustrates a mobile phone as an example to describe the display device 1111. The display device 1111 may be a computer, a TV, a vehicle-mounted display device, or any other display device with a display function, which may not be limited by the present disclosure. The display device 1111 in the present disclosure may have the beneficial effects of the display panel 111 in the present disclosure, which may refer to specific descriptions of the display panel 111 in the foregoing embodiments, and may not be repeated herein.

The fingerprint recognition module, the display panel and display device in the present disclosure may at least include following beneficial effects. In the present disclosure, the second electrode layer in the fingerprint recognition module may include a plurality of second electrodes, and each second electrode may be used as a driving electrode. The flexible circuit board configured to provide the driving voltage signal to the fingerprint recognition module and to read the fingerprint detection signal may be directly bonded and connected to the second electrodes. In the prior art, the second electrode is often connected to the flexible circuit board through a thin lead to achieve the transmission of an electrical signal. A width of the lead used as a wiring is significantly different from a width of the second electrode used as a driving electrode, and the width of the general lead is much smaller and is a few hundredths or even a few thousandths of the width of the second electrode. The size of the line width may affect the size of the cross-sectional area of a resistor, thereby affecting the resistance value of the resistor. The smaller the line width, the smaller the cross-sectional area, and the greater the resistance. Therefore, when the conditions are basically the same, the resistance of the lead used as the wiring may be much greater than the resistance of the second electrode used as the driving electrode.

Therefore, in the disclosed embodiments, the flexible circuit board configured to provide the driving voltage signal to the fingerprint recognition module and to read the fingerprint detection signal may be directly bonded and connected to the second electrodes, and the lead may not be used in the module structure, which may effectively avoid the loss of the driving signal transmitted between the flexible circuit board and the second electrode and serious power loss due to large impedance of lead, thereby reducing the power loss of the fingerprint recognition module, achieving ultrasonic fingerprint recognition, and improving recognition performance. At the same time, when the touch event occurs, the flexible circuit board may merely provide the alternating current signal to the second electrode involved in the touch event, and may not provide the signals to the remaining second electrodes. Therefore, the power supply area may be reduced, and the capacitive load during driving process may be reduced, which may facilitate to further reduce the power consumption.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:
1. A fingerprint recognition module, comprising:
 a first electrode layer, including a plurality of first electrodes that are arranged in an array;
 a piezoelectric layer, disposed on a side of the first electrode layer;

a driving circuit layer, electrically connected to the first electrode layer;

a second electrode layer, disposed on a side of the piezoelectric layer facing away from the first electrode layer, wherein the second electrode layer includes a plurality of second electrodes that are arranged along a first direction, and one second electrode of the plurality of second electrodes overlaps at least two first electrodes of the plurality of first electrodes; and a flexible circuit board, bonded and connected to the plurality of second electrodes, wherein:

in a plane parallel to the first electrode layer, the plurality of second electrodes and the flexible circuit board are arranged along a second direction, the first direction intersects the second direction, a barrier spacer is disposed between adjacent two second electrodes of the plurality of second electrodes, the driving circuit layer at least includes a common signal line, and the common signal line is extended along the second direction, and the common signal line at least includes a first common signal line, wherein an orthographic projection of the first common signal line on a plane of the first electrode layer at least partially overlaps an orthographic projection of the barrier spacer on the plane of the first electrode layer.

2. The fingerprint recognition module according to claim 1, wherein:

the flexible circuit board includes a plurality of pins, and one second electrode of the plurality of second electrodes is bonded and connected to corresponding one pin of the plurality of pins.

3. The fingerprint recognition module according to claim 1, wherein:

a second electrode of the plurality of second electrodes has a rectangular shape, and along the first direction, a length of the second electrode is A, and along the second direction, a length of the second electrode is B, wherein B>A.

4. The fingerprint recognition module according to claim 3, wherein:

2 mm≤A≤5 mm, and B>5 mm.

5. The fingerprint recognition module according to claim 1, wherein:

the barrier spacer is extended along the second direction, and an orthographic projection of the barrier spacer on a plane of the flexible circuit board at least partially overlaps the flexible circuit board.

6. The fingerprint recognition module according to claim 1, wherein:

the driving circuit layer includes a plurality of driving circuits, and the plurality of driving circuits are arranged in an array, and in the plane parallel to the first electrode layer, an interval between the adjacent two second electrodes is located between adjacent two columns of the plurality of driving circuits.

7. The fingerprint recognition module according to claim 1, wherein:

the common signal line further includes a second common signal line, and an orthographic projection of the second common signal line on the plane of the first electrode layer does not overlap the orthographic projection of the barrier spacer on the plane of the first electrode layer, wherein a line width of the second common signal line is less than a line width of the first common signal line.

8. The fingerprint recognition module according to claim 1, wherein:

the driving circuit layer further includes a plurality of sub-connection lines, and the plurality of sub-connection lines are connected to each other through the common signal line, wherein a sub-connection line of the plurality of sub-connection lines is extended along the first direction, and a line width of the common signal line is greater than a line width of the sub-connection line.

9. The fingerprint recognition module according to claim 1, wherein:

a driving circuit of the plurality of driving circuits includes a first transistor, a second transistor, a third transistor, and a storage capacitor, and the driving circuit layer further includes a scanning line, a detection signal line, a power signal line, and a sampling signal line, wherein:

a first electrode of the plurality of first electrodes is connected to a storage node, a gate of the first transistor is connected to the storage node, a first terminal of the first transistor is connected to the power signal line, and a second terminal of the first transistor is connected to a first terminal of the third transistor, a gate of the second transistor is connected to the sampling signal line, a first terminal of the second transistor is connected to the storage node, and a second terminal of the second transistor is connected to the common signal line, a gate of the third transistor is connected to the scanning line, and a second terminal of the third transistor is connected to the detection signal line, a first terminal of the storage capacitor is connected to the storage node, and a second terminal of the storage capacitor is connected to the power signal line, and the scanning line is extended along the second direction.

10. The fingerprint recognition module according to claim 1, wherein:

an orthographic projection of the barrier spacer on a plane of the first electrode layer does not overlap a first electrode of the plurality of first electrodes.

11. The fingerprint recognition module according to claim 1, wherein:

the barrier spacer is made of a material including an organic material.

12. The fingerprint recognition module according to claim 1, wherein:

a difference between an acoustic resistance of a material for forming the barrier spacer and an acoustic resistance of a material for forming the plurality of first electrodes and the plurality of second electrodes is less than or equal to 9 MRayl.

13. The fingerprint recognition module according to claim 1, wherein:

a surface of the barrier spacer adjacent to the first electrode layer is a first surface, and a surface of the second electrode adjacent to the first electrode layer is a second surface, wherein the first surface and the second surface are disposed in a same plane.

14. A display panel, comprising:

a fingerprint recognition module, wherein the fingerprint recognition module includes:

a first electrode layer, including a plurality of first electrodes that are arranged in an array;

a piezoelectric layer, disposed on a side of the first electrode layer;

a driving circuit layer, electrically connected to the first electrode layer;

a second electrode layer, disposed on a side of the piezoelectric layer facing away from the first electrode layer, wherein the second electrode layer includes a plurality of second electrodes that are arranged along a first direction, and one second electrode of the plurality of second electrodes overlaps at least two first electrodes of the plurality of first electrodes;

a flexible circuit board, bonded and connected to the plurality of second electrodes, wherein in a plane parallel to the first electrode layer, the plurality of second electrodes and the flexible circuit board are arranged along a second direction, and the first direction intersects the second direction; and a display module, disposed opposite to the fingerprint recognition module, wherein:

the fingerprint recognition module is disposed on a side of the display module facing away from a light-exiting surface of the display panel, the first electrode layer is disposed on a side of the second electrode layer adjacent to the display module, a barrier spacer is disposed between adjacent two second electrodes of the plurality of second electrodes, the driving circuit layer at least includes a common signal line, and the common signal line is extended along the second direction, and the common signal line at least includes a first common signal line, wherein an orthographic projection of the first common signal line on a plane of the first electrode layer at least partially overlaps an orthographic projection of the barrier spacer on the plane of the first electrode layer.

15. The display panel according to claim 14, further including:

a touch-control layer, disposed on a side of the display module adjacent to the light-exiting surface of the display panel.

16. A display device, comprising the display panel according to claim 14.

17. A driving method of a display panel, configured to drive the display panel to perform a touch detection and a fingerprint recognition, comprising:

providing the display panel, wherein the display panel includes a fingerprint recognition module and a touch-control layer, the fingerprint recognition module including:

a first electrode layer, including a plurality of first electrodes, a piezoelectric layer, disposed on a side of the first electrode layer, a second electrode layer, disposed on a side of the piezoelectric layer facing away from the first electrode layer, wherein the second electrode layer includes a plurality of second electrodes, and a barrier spacer is disposed between adjacent two second electrodes of the plurality of second electrodes, a flexible circuit board, bonded and connected to the plurality of second electrodes, and a driving circuit layer, electrically connected to the first electrode layer, wherein the driving circuit layer includes a plurality of driving circuits, a common signal line, a scanning line, a detection signal line, a power signal line, and a sampling signal line, and a driving circuit of the plurality of driving circuits includes a first transistor, a second transistor, a third transistor, and a storage capacitor, wherein the common signal line at least includes a first common signal line, wherein an orthographic projection of the first common signal line on a plane of the first electrode layer at least partially overlaps an orthographic projection of the barrier spacer on the plane of the first electrode layer;

determining a touch position of a finger through the touch-control layer, for the touch detection;

determining a second electrode of the plurality of second electrodes corresponding to the touch position of the finger;

providing an excitation signal only to the second electrode corresponding to the touch position of the finger, wherein a corresponding first electrode of the plurality of first electrodes is connected to a common potential, and the piezoelectric layer between the second electrode and the first electrode corresponding to the touch position of the finger generates ultrasonic waves; and performing, by the driving circuit corresponding to the second electrode corresponding to the touch position of the finger, ultrasonic fingerprint recognition, for the fingerprint recognition.

18. The driving method according to claim 17, wherein the fingerprint recognition includes:

in an excitation stage, providing an alternating current signal only to the second electrode corresponding to the touch position of the finger, wherein the piezoelectric layer generates ultrasonic waves;

in a sampling stage, generating, by the piezoelectric layer, different electrical signals when ultrasonic waves are reflected by fingerprint valleys and fingerprint ridges of the finger back to the piezoelectric layer, and converting the different electrical signals into different charges stored in the storage capacitor in the driving circuit through sampling; and in a reading stage, proving a scanning signal through the scanning line, and reading the charges stored in the storage capacitor of each driving circuit through the detection signal line, to complete the fingerprint recognition.

* * * * *